(12) United States Patent
Wuytack et al.

(10) Patent No.: US 6,421,809 B1
(45) Date of Patent: Jul. 16, 2002

(54) METHOD FOR DETERMINING A STORAGE BANDWIDTH OPTIMIZED MEMORY ORGANIZATION OF AN ESSENTIALLY DIGITAL DEVICE

(75) Inventors: Sven Wuytack, Herent; Francky Catthoor, Temse; Hugo De Man, Leuven, all of (BE)

(73) Assignee: Interuniversitaire Micro-Elektronica Centrum (IMEC VZW) (BE)

( * ) Notice: Subject to any disclaimer, the term of this patent is extended or adjusted under 35 U.S.C. 154(b) by 0 days.

(21) Appl. No.: 09/360,140

(22) Filed: Jul. 23, 1999

Related U.S. Application Data

(60) Provisional application No. 60/094,124, filed on Jul. 24, 1998.

(51) Int. Cl.⁷ .............................................. G06F 17/50
(52) U.S. Cl. .............................................. 716/2; 716/5
(58) Field of Search ........................................ 716/2, 5

(56) References Cited

U.S. PATENT DOCUMENTS 5,327,561 A * 7/1994 Choi .............................. 717/9
5,742,814 A * 4/1998 Balasa ......................... 707/102

OTHER PUBLICATIONS

Wuytack, S. et al., "Flow graph balancing for minimizing the required memory bandwidth". IEEE. Nov. 1996, pp. 127–132.*

L. Stok, "Data Path Synthesis, Integration, The VLSI Journal", vol. 18, pp. 1–71, Jun. 1994.

P. Lippens, J. van Meerbergen, W. Verhaegh, A. van der Werf, "Allocation Of Multiport Memories For Hierarchical Data Streams", Proceedings IEEE International Conference on Computer–Aided Design, pp. 728–735, Santa Clara, Nov. 1993.

O. Sentieys, D. Chillet, J. P. Diguet, J. Philippe, "Memory Module Selection For High–Level Synthesis", Proceedings IEEE workshop on VLSI signal processing, Monterey, CA, Oct. 1996. pps. 272–283.

(List continued on next page.)

Primary Examiner—John F. Niebling
Assistant Examiner—Stacy Whitmore
(74) Attorney, Agent, or Firm—Knobbe, Martens, Olson & Bear LLP

(57) ABSTRACT

A formalized method and a design system are described for part of the design decisions, related to memory, involved while designing an essentially digital device. The method and system determine an optimized memory organization starting from a representation of said digital device, the representation describing the functionality of the digital device and comprising data access instructions on basic groups, which are groups of scalar signals. The method and system determine optimized scheduling intervals of said data access instructions such that execution of said functionality with the digital device is guaranteed to be within a predetermined cycle budget, the determining of the optimized scheduling intervals comprising optimizing access conflicts with respect to an evaluation criterion related to the memory cost of said digital device. An optimized memory organization is selected in accordance with the optimized scheduling intervals and the optimized access conflicts.

29 Claims, 14 Drawing Sheets

OTHER PUBLICATIONS

F. Balasa, F. Catthoor, H. DeMan, "Dataflow–Driven Memory Allocation For Multi–Dimensional Processing Systems", Proceedings IEEE International Conference on Computer Aided Design, San Jose, CA, Nov. 1994. pps. 31–34.

M. Al–Mouhamed, S. Seiden, "A Heuristic Storage For Minimizing Access Time Of Arbitrary Data Patterns", IEEE Transactions on Parallel and Distributed Systems, vol. 8, No. 4, pp. 441–447, Apr. 1997.

S. Pinter, "Register Allocation With Instruction Scheduling: A New Approach", ACM SIGPLAN Notices, vol. 28, pp. 248–257, Jun. 1993.

W. Verhaegh, P. Lippens, E. Aarts, J. Korst, J. van Meerbergen, A. van der Werf, "Improved Force–Directed Scheduling In High–Throughput Digital Signal Processing", IEEE Transactions on CAD and Systems, vol. 14, No. 8, Aug. 1995. pp. 945–960.

S. Wuytack, et al. "Flow Graph Balancing for Minimizing the Required Memory Bandwidth", IEEE System Synthesis, 1996 proceedings, $9^{th}$ edition.

* cited by examiner

```
for(i=1 to 100)
 {
 a=A[i]; b=B[i];
 c=f(a, b);
 C[i]=c;
 }
```

```
a'=A[1]; b'=B[1];
for(i=1 to 100)
 {
 a=A[i+1]; b=B[i+1];
 c=f(a', b');
 C[i]=c; a'=a; b'=b;
 }
c=f(a', b');
C[100]=c;
```

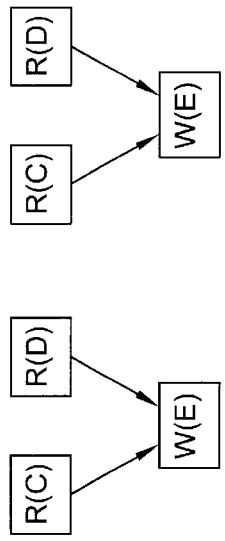
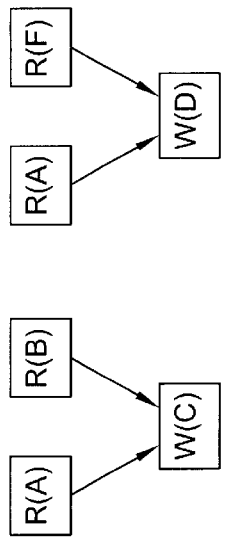
FIG. 10B
FIG. 10A

| FIG. 11A |
| FIG. 11B |

METHOD FOR DETERMINING A STORAGE BANDWIDTH OPTIMIZED MEMORY ORGANIZATION OF AN ESSENTIALLY DIGITAL DEVICE

RELATED APPLICATION

This application claims priority to Provisional Application No. 60/094124, filed on Jul. 24, 1998.

FIELD OF THE INVENTION

The invention relates to methods for designing essentially digital devices, and focuses on memory related design issues, more in particular with respect to power consumption of said digital devices.

BACKGROUND OF THE INVENTION

An essentially digital device comprises at least of a memory organization (an amount of memories with their sizes and an interconnection pattern); and registers. Such a memory organization is determined during the design process of said digital device. The operation of an essentially digital system can essentially be described as a set of data access operations or instructions on data structures or variables, being stored in said memories.

In [L. Stok, Data path synthesis, integration, the VLSI journal, Vol.1.18, pp.1–71, June 1994.] register allocation, starting from a filly scheduled flow graph (thus ordered data access operations or instructions are used as input), are resented. Said allocation techniques are scalar oriented. Many of these techniques construct a scalar conflict or compatibility graph and solve the problem using graph coloring or clique partitioning. This conflict graph is fully determined by the schedule which is fixed before. This means that no effort is spent to come up with an optimal conflict graph and thus the potential optimization by reconsidering the schedule is. not exploited. Moreover only register allocation is addressed and not memories.

In the less explored domain of memory allocation and assignment for hardware systems, the current techniques start from a given schedule [L, Ramachandran, D. Gajski, V. Chaiyakul, An algorithm for array variable clustering, Proceedings European Design and Test Conference, pp.262–266, Paris, March. 1994.],[P. Lippens, J. van Meerbergen, W. Verhaegh, A. van der Werf, Allocation of Multiport Memories for Hierarchical Data Streams, Proceedings IEEE International Conference on Computer-Aided Design, pp.728–735, Santa Clara, November 1993.], [O. Sentieys, D. Chillet, J. P. Diguet, J. Philippe, Memory module selection for high-level synthesis, Proceedings IEEE workshop on VLSI signal processing, Monterey Calif., Oct. 1996.] or perform first a bandwidth estimation step [F. Balasa, F. Catthoor, H. DeMan, Dataflow-driven memory allocation for multi-dimensional processing systems", Proceedings IEEE International Conference on Computer Aided Design}, San Jose Calif., November 1994.] which is a kind of crude ordering that does not really optimize the conflict graph either. These techniques have to operate on groups of signals instead of on scalars to keep the complexity acceptable.

In the parallel compiler domain [M. Al-Mouhamed, S. Seiden, A Heuristic Storage for Minimizing Access Time of Arbitrary Data Paterns, IEEE Transactions on Parallel and Distributed Systems, Vol.8, No.4, pp.441–447, Apr. 1997.] proposes a technique to partition arrays into groups of data that have to be assigned to different memories such that they can be accessed simultaneously for an SIMD architecture. They combine the constraints of a number of given access patterns into a single linear address transformation that calculates for every data element the memory in which it should be stored to minimize the total access time. This technique allows to avoid the allocation of multi-port memories for storing data with self-conflicts, by explicitly splitting arrays into smaller arrays that can be assigned to single port memories. However said method does not exploit all optimization opportunities for instance by rescheduling data access instructions.

In the scheduling domain, the techniques optimizing for the number of resources given the cycle budget mostly operate on the scalar level. Many of these techniques try to reduce the memory related cost by estimating the required number of registers for a given schedule. Only few of them try to reduce the required memory bandwidth, which they do by minimizing the number of simultaneous data accesses. They do not take into account which data is being accessed simultaneously. Also no real effort is spent to optimize the data access conflict graphs such that subsequent register/memory allocation tasks can do a better job.

[S. Pinter, Register Allocation with Instruction Scheduling: a New Approach, ACM SIGPLAN Notices, Vol.28, pp.248–25, June 1993.] optimizes a conflict graph in the context of scalar register allocation by removing weighted edges in a coloring problem prior to scheduling. However, the conflicts in their initial conflict graph are determined by the sequential ordering of the input code. Also this idea was not applied to groups of scalars.

The Improved Force Directed Scheduling (IFDS) [W. Verhaegh, P. Lippens, E. Aarts, J. Korst, J. van Meerbergen, A. van der Werf, Improved Force-Directed Scheduling in High-Throughput Digital Signal Processing, IEEE Transactions on CAD and Systems, Vol.14, No.8, August 1995.] shows a method wherein scheduling intervals are gradually reduced until the desired result is obtained. The cost function used to determine which scheduling interval has to be reduced at each iteration only takes the number of parallel data accesses to reduce the required memory bandwidth into account. (I)FDS does not take into account which data is being accessed. Balancing the number of simultaneous data accesses is a local optimization which can be very bad globally. In IFDS all data is treated equally, although in practice some simultaneous data accesses are more expensive in terms of memory cost than other. Also the required number of memories cannot be estimated accurately by looking locally only, as is done in IFDS, because all conflicts have to be considered for this.

SUMMARY OF THE INVENTION

In a first aspect of the invention a method and a design system for determining an optimized memory organization of an essentially digital device is presented. The design system may be a suitable computer such as a workstation for carrying out the method. The design system is adapted to carry out each of the method steps. Said method and system exploit a representation, comprising at least data access instructions on groups of scalar signals, of the functionality of said digital device, which is under construction. As the method and system focuses on data transfer and storage, it is sufficient to have a control flow graph representation, although the method is not limited to such representation. For said data access instructions the scheduling intervals are optimized, meaning modified, in order to optimize a certain optimization criterion, with the restriction that the execution of said functionality with said digital device is within a predetermined cycle budget or timing. The method and design system according to the present invention provides sufficient memory bandwidth (parallel memory ports) such that the application can be scheduled within the cycle budget during further digital device design steps. The method and design system according to the present invention solves a Storage-Bandwidth Optimization (SBO) problem. The method and system determines for which data parallel access capabilities should be provided such that the cycle budget can still be met with minimum bandwidth requirements on the memory architecture. These requirements are expressed as conflicts in a conflict graph. Access conflicts may be described as single or intra-cycle conflicts as conflicts not in the same cycle are not necessarily considered as conflicts in accordance with the present invention, i.e. the lifetime of the data is not considered in a first approximation. In said evaluation criterion the conflict cost between basic groups and self-conflicts of basic groups can be weighted separately. The task of SBO is to come up with an optimized conflict graph, allowing the memory allocation and assignment tasks to come up with a cheaper memory architecture with fewer memories and ports. In the method and design system, optimized scheduling intervals are determined by optimizing an extended conflict graph with respect to an evaluation criterion being related to the memory cost of said digital device. Finally, a selection of an optimized memory organization satisfying at least the constraints depicted by said optimized extended conflict graph, is performed.

In a second aspect of the invention said extended conflict graph is an undirected hyper-graph, comprising of nodes representing said basic groups; binary edges representing data access conflicts between the two basic groups connected by said binary edge; hyper edges representing data access conflicts between at least three basic groups connected by said hyper edge; and self-edges representing data access conflicts of said basic group connected to itself by said self-edge. Each of said edges is associated with a triplet of numbers, the first number of said triplet defining the amount of simultaneous data accesses to said basic groups of said edges due to read instructions, the second number of said triplet defining the amount of simultaneous data accesses to said basic groups of said edges due to write instructions and the third number of said triplet defining the amount of simultaneous data accesses to said basic groups of said edges due to either read or write instructions, said triplet being characteristic for an at least partial scheduling of said data access instructions of said functional representation, wherein a partial scheduling comprises scheduling intervals. For every conflict, the maximum number of reads (R), writes (W), and total number of data accesses (i.e., read or write) that can occur (RW) simultaneously must be known. This information is shown next to the conflict edges in the form R/W/RW.

In a third aspect of the invention the optimization or evaluation criterion which is optimized with the method or the system according to the present invention, takes into account which data is accessed in parallel and enables separate weighting of each of the basic group conflicts and each basic group self-conflict. Said evaluation criterion comprises an estimate of the chromatic number of the conflict graph, being defined as said extended conflict graph without self-edges and hyper-edges. Further said evaluation criterion comprises of the total amount of data accesses of each self-edge separately and a pair-wise basic group conflict cost, also for each basic group conflict separately. Said pair-wise basic group conflict costs take into account the sizes of said basic groups, the total amount of data accesses to said basic groups, the bit width and word size of said basic groups.

In a fourth aspect of the invention an optimized memory organization is selected which satisfies at least the constraints depicted by said optimized extended conflict graph, comprising assigning basic groups being in conflict either to different memories or assigning basic groups being in conflict to a multi-port memory having at least a number, defined by said third number of the triple, of ports, at least a number, defined by said first number of the triplet, of said ports, having read capability, and at least a number, defined by said second number of said triplet, of said ports, having write capability. The Extended Conflict Graph represents the constraints that have to be satisfied by the subsequent memory allocation and assignment tasks to be sure that the cycle budget can still be met later on during detailed scheduling. When two basic groups are in conflict, this conflict has to be resolved during memory allocation/assignment. This can be done in two ways: either the basic groups are assigned to two different memories, or they are assigned to a multiport memory. In the latter case, the R/W/RW numbers associated with the conflict determine the number and type of ports that are minimally required on the multi-port memory to which these two basic groups are assigned: the memory must have at least RW ports, of which at least R must provide read capability and at least W must provide write capability. When more than two conflicting basic groups that are connected by a hyper edge in the ECG are assigned to a single memory, the R/W/RW number of the hyper edge determines the number and type of ports that are minimally required on the multi-port memory to which they are assigned.

In a fifth aspect of the invention a method and a design system for solving said optimization problem is presented. Said method or system involves an iterative procedure, starting from an initial scheduling of said data access instructions. An initial value of the optimization or evaluation criterion is determined. In said evaluation criterion the probability of having a basic group conflict is taken into account. Note that a conflict graph is only defined for a given schedule. As here only probabilities of conflicts are known, a particular approach for determining a chromatic number in such is situation is needed and thus presented in the invention. In the method or design system a plurality of possible scheduling interval reductions are determined. The effect of each of said reductions on the evaluation criterion is determined, the best reduction (having the largest impact on the criterion) is selected. Said selected reduction is then executed. The set of possible scheduling intervals is then modified. Said procedure is repeated until no further reductions in the evaluation criterion can be found.

In a sixth aspect of the invention the method and design system for determining an optimized memory organization is adapted for applications, having a representation comprising of manifest conditions, data-dependent conditions and loop bodies. In said method and said design system a preprocessing step is performed which determines for disjunct blocks of said representation a block cycle budget. Said block cycle budgets are then used as additional constraints within said determining of optimized schedule intervals. Said determining of block cycle budgets comprises optimizing an allowable conflict graph with respect to an evaluation criterion for said allowable conflict graph. An iterative procedure for finding an optimized allowable conflict graph is presented.

In a seventh aspect of the invention the determining of basic groups, being groupings of scalar signals, is presented for real-time multi-dimensional applications and network applications, with dynamically allocated data types.

BRIEF DESCRIPTION OF THE DRAWINGS

FIG. 10 shows the partitioning of a representation of the functionality of a digital system under construction in disjunct blocks and the control data flow graph related to each of the resulting blocks.

DETAILED DESCRIPTION OF THE INVENTION

Figure 1:
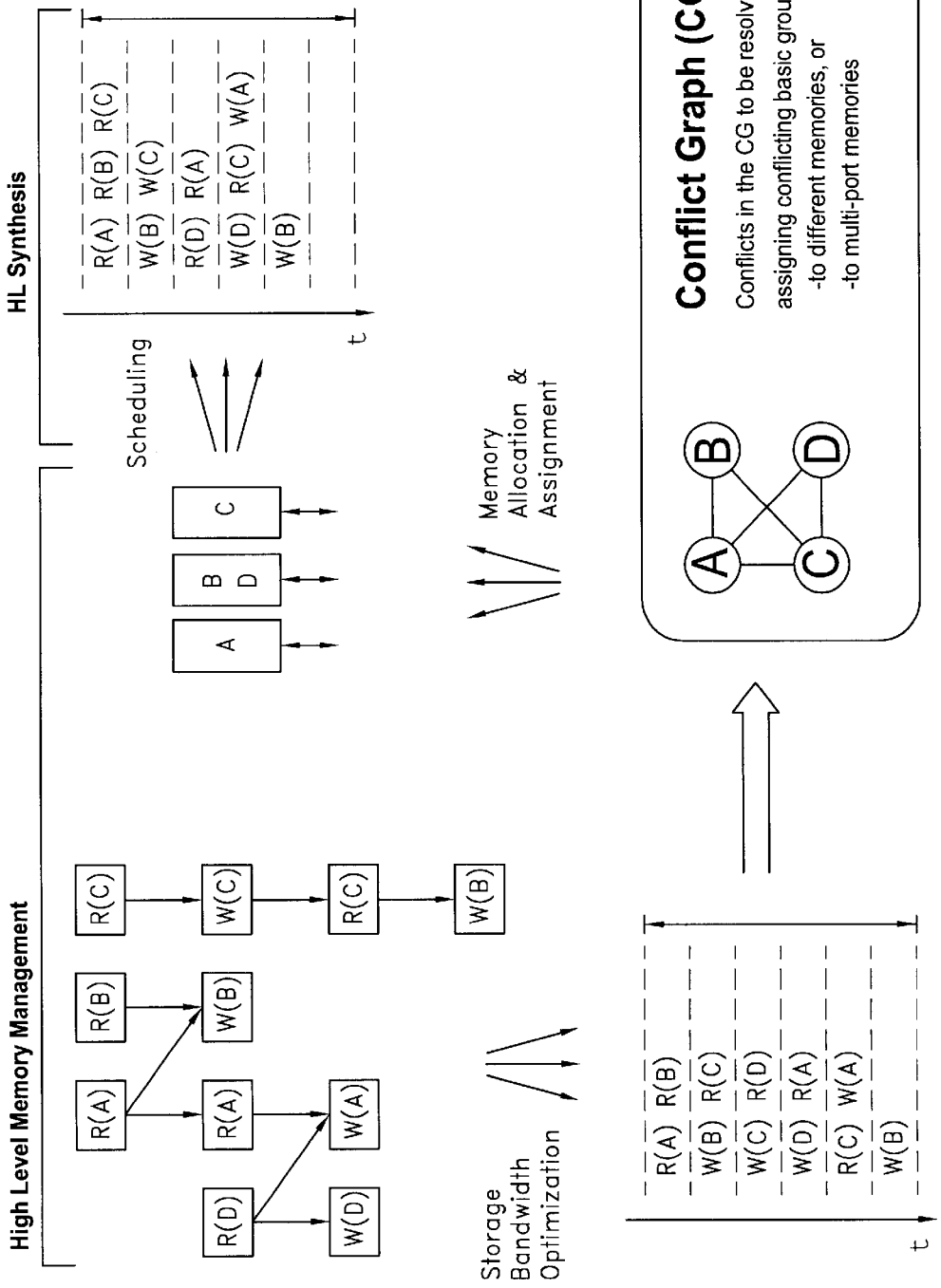
FIG. 1 shows a control data flow graph (top left), being a representation of the functionality of the digital device under construction. It shows data access instructions (read and write instructions) and shows an ordering between them which must be satisfied. A potential scheduling of the data access instructions is shown in the lower left corner of the figure. Said scheduling can be the result of the storage bandwidth optimization performed by the method according to the present invention. Note that said scheduling is not necessarily the final scheduling of said instructions. In the top right corner of the figure another scheduling which is still valid, is shown. The conflicts to be satisfied are represented in a conflict graph. For each data signal, a node in the conflict graph is foreseen. The focus is on groups of signals, also denoted basic groups. An example of a basic group can be an array variable. The method determines an optimized conflict graph. From said optimized conflict graph an optimized memory organization is determined for instance by assigning conflicting basic groups, being indicated by an edge, to different memories or to multi-port memories. The top middle part of the figure shows a potential memory assignment.

Below a detailed description of the invention is given although thee invention is not limited hereto.

In the invention a method for determining an optimized memory organization of an essentially digital device is presented. A digital device comprises at least of a processor with its own local registers and a memory part. In the invention a method for determining an optimized memory organization (how many memories, which size for each memory, interconnection patterns of said memories), such that the digital device can run with optimal performance (for instance with minimal power consumption) is presented. A digital device has a certain functionality, which can be represented by code, written in some programming language. It is said in accordance with the present invention that said digital device is described by a representation. The invention focuses on data-dominated applications being defined as applications wherein power consumption due to accessing data in memories is dominating the power consumption due to arithmetic operations. Said representation therefore comprises at least data access instructions on basic groups, being groups of scalar signals. With signals is here meant variables or data. Said data access instructions are typically read or write instructions. Said applications can be but are not limited to real-time multi-dimensional signal processing applications or network applications with dynamically allocation data types.

It must be emphasized that the method according to the present invention is part of the design process for said digital device. So the digital device is under construction. Only its functional representation should be known for the method. Indeed it is believed that the organization of the global communication and data storage are the dominating factors in system level design for many applications. Therefore a design methodology in which the memory architecture is optimized as a first step before doing the detailed scheduling of the data access instructions, and data-path and controller synthesis, is proposed. A basic principle of the invention is that an optimal matching between the memory organization and the scheduling of the instructions, being performed by said digital device, once it is designed, is determined. With optimal performance of said digital device can be meant having low power consumption while executing the application, described by the functional representation.

For said data access instructions the scheduling intervals are optimized, meaning changed, in order to optimize a certain optimization criterion, with the restriction that the execution of said functionality with said digital device is within a predetermined cycle budget or timing.

As according to the digital device design methodology the memory architecture has to be defined before doing the detailed scheduling of the data access instructions, sufficient memory bandwidth (parallel memory ports) such that the application can be scheduled within the cycle budget afterwards, must be provided. Therefore the method according to the present invention solves a Storage-Bandwidth Optimization (SBO) problem.

Given, for instance, a control data flow graph (CDFG), being a representation, representing the behavior or functionality of the application to be implemented and the cycle budget in which the application has to be scheduled, the method according to the present invention determines for which data parallel access capabilities should be provided such that the cycle budget can still be met with minimum bandwidth requirements on the memory architecture. These requirements are expressed as conflicts in a conflict graph (FIG. 1).

If then subsequent memory allocation and assignment steps in the design methodology find a memory architecture that satisfies all conflicts in this graph, it is guaranteed that there exists a valid schedule that meets the cycle budget The task of SBO is to come up with an optimized conflict graph, allowing the memory allocation and assignment tasks to come up with a cheaper memory architecture with fewer memories and ports.

In the method the determining of said optimized scheduling intervals comprises optimizing an extended conflict graph with respect to an evaluation criterion being related to the memory cost of said digital device. Finally a selection of an optimized memory organization satisfying at least the constraints depicted by said optimized extended conflict graph, is performed.

Figure 2:
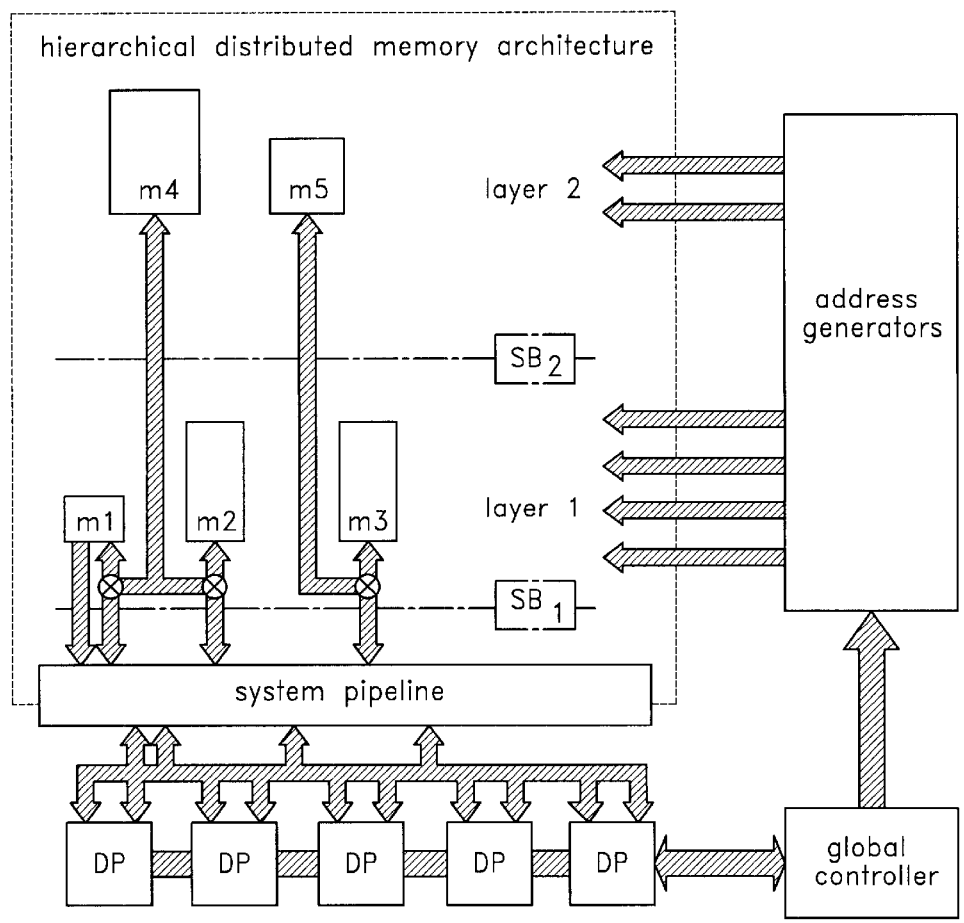
FIG. 2 shows an architecture of a digital device. A memory part comprising of a hierarchical, layered memory organization is shown. Further datapaths, controllers and address generators are shown.

FIG. 2 shows a target architecture. It consists of four parts: a hierarchical distributed memory architecture, the data paths, a global controller, and address generators for the memories. The system pipeline between the memory architecture and the data paths contains pipeline registers that temporarily buffer data being transferred between the data paths and the memory. The clocking frequency of the registers in the system pipeline defines the duration of a storage cycle. A storage cycle is the time unit for scheduling transfers between the data paths and the background memory. The duration of a storage cycle does not have to be equal to the duration of the data path clock cycles. Usually one is a multiple of the other, however, as the data path operations and the memory transfers have to remain synchronized. If the memories are fast enough, which is usually the case for memories on the first layer in the hierarchy because the clocking frequency is adapted to them, one data transfer can occur per storage cycle and memory port.

Storage-bandwidth (SB) can be defined as the number of ports in the memory architecture. The figure shows that the SB can be split up according to the layers in the memory hierarchy: $SB_1$ indicates how much data can be transferred to/from layer 1 in one cycle (assuming a transfer takes exactly one cycle). $SB_2$ does the sample for layer 2, and so on. The SBO task solved by the method according to the present invention optimizes the storage-bandwidth requirements of an application. it does not necessarily minimize them. Indeed, not all ports are equally costly in a memory architecture: ports on a multiport memory for instance are more costly because storing data in a multiport memory is expensive both in terms of area and power. Minimizing the storage-bandwidth corresponds to minimizing the maximum number of simultaneous data transfers. Often this requires one huge and very inefficient multiport memory with a number of ports equal to the maximal number of simultaneous data transfers. This is unacceptable in most cases, especially when much cheaper solutions exist, which is usually the case. Therefore, the SBO task tries to come up with optimal bandwidth constraints such that the final memory architecture can be made as cheap as possible.

The main difference between SBO method in accordance with the present invention and the related work discussed above is that in the invention an attempt is made to minimize the required memory bandwidth in advance by optimizing the access conflict graph for groups of scalars within a given cycle budget. This is done by putting ordering constraints on the flow graph, taking into account which data accesses are being put in parallel (i.e. these will show up as a conflict in the access conflict graph). In the approach according to the present invention, a partial ordering of the data access instructions is determined while optimizing the conflict graph. The fact that the invention works on groups of data is an important difference, because it affects the meaning of the conflicts. In the scalar case, the conflicts are storage conflicts: there is a conflict when the lifetimes of two values overlap, accessibility is usually not taken into account. On the other hand, in the invention, the conflicts are accessibility conflicts: there is a conflict when two groups of scalars are accessed simultaneously; the life times of the data are not necessarily taken into account in the method according to the present invention.

Figure 3:
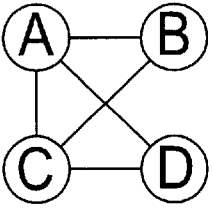
FIG. 3 shows the influence of the method according to the present invention on the memory organization of the digital device. The data access instruction ordering shown in the top half of the figure results in a conflict graph with a chromatic number of 3, which means (assuming only single-port memories are available) that a valid memory configuration requires at least 3 memories with this ordering. A small change to this ordering is shown in the bottom half of the figure. This change results in a conflict graph with a chromatic number of only 2, meaning that 2 single-port memories are sufficient for this ordering.

That the invented SBO method heavily influences the quality of the results of the subsequent design tasks is shown in FIG. 3. It shows that a small change in the ordering of data accesses can have a large effect on the required memory) bandwidth. The ordering shown in the top half of the figure results in a conflict graph with a chromatic number of 3, which means (assuming only single-port memories are available) that a valid memory configuration requires at least 3 memories with this ordering. A small change to this ordering is shown in the bottom half of the figure. This change results in a conflict graph with a chromatic number of only 2, meaning that 2 single-port memories are sufficient for this ordering. This large effect on the resulting memory architecture clearly shows that SBO is in general very useful as a preprocessing step for memory allocation tasks hence demonstrating the utility of the present invention. Even though a complete ordering is shown for the data accesses in this example, SBO only imposes a partial ordering. The subsequent scheduling steps at lower abstraction levels still have a lot of freedom left which can be use to optimize data-path and controller related costs. This can for instance be seen in FIG. 1, where the final schedule and the ordering obtained during SBO are completely different.

Figure 4A:
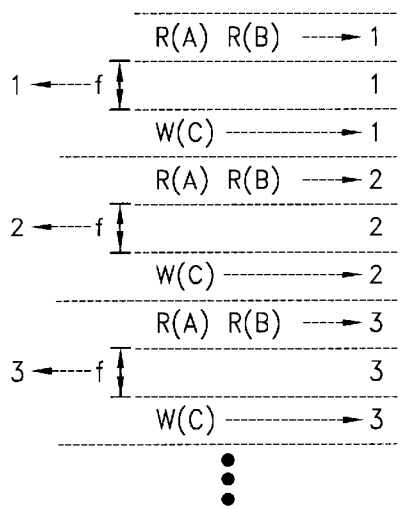
FIG. 4 shows the application of loop pipelining in order to increase freedom for data path synthesis: (a) without loop pipelining and (b) with loop pipelining.
Figure 4B:
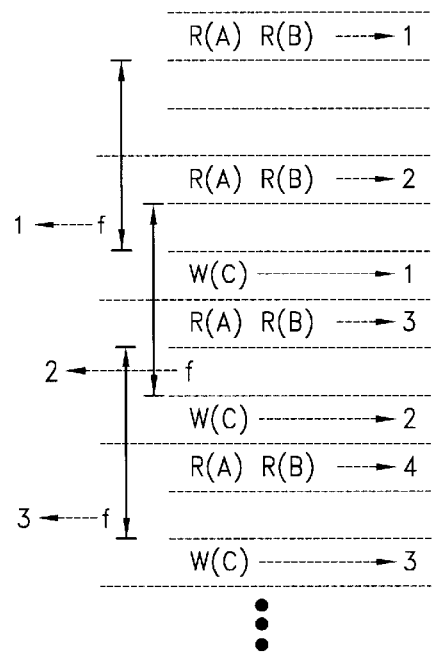

The SBO task focuses on the data transfers and does not necessarily take the data path operations into account. In many data-dominated applications, the data path operations are very simple and can easily be performed in one cycle. Retrieving the operands from and storing the results in memory are the most time consuming operations in this case. In case there are complex data path operations that take (much) more than one cycle to complete, this can be dealt with in two ways: In a first approach explicitly modeling the duration of the data path operation by means of extra timing constraints between the data transfers of the operands and the transfer of the results or in a second approach in case of loops, by applying loop pipelining during the data path synthesis task to increase the time between reading the operands and writing the results, as shown in FIG. 4. From this it can concluded that it is a reasonable assumption to focus on the data transfers early in the design flow, leaving the arithmetic and logic parts to the data path and controller synthesis tasks. Since the dominance of the data storage and transfer on the overall system cost is usually very large, suboptimal solutions for these remaining tasks are likely to have only a secondary effect on the overall cost.

To deal with realistic applications, the memory assignment task should assign groups of scalars to memories instead of individual scalars. These groups of scalars are called basic groups (BGs). They form a partitioning of all data that has to be stored in background memory. This partitioning is decided earlier during the design process of said digital device and is done in such a way that for every important data access (read or write) in the flow graph it is known which basic group is being accessed.

In the case of multi-dimensional signal processing applications, the basic groups can be (parts of) multi-dimensional arrays. In the case of network applications, the basic groups can be (parts of) virtual memory segments.

The control data flow graph (CDFG) describes the algorithm to be implemented and is as such an interesting representation of the functionality of said digital device under construction. As the SBO task focuses on the data storage, only the data accesses and the dependencies between them together with the control flow (i.e., loops and conditions) are of interest. The arithmetic part of the functional representation of the digital device is considered unimportant at this stage in the optimization process and may be considered after the memory organization has been optimized. The CDFG must be at the basic group level. With this it is meant that, for every data access (i.e., read or write instruction) in the CDFG, it must be indicated which basic group is being accessed.

The cycle budget describes the timing, in which the functionality of said digital device under construction, and described in the CDFG, must be executed. The SBO task decides which basic groups should be made accessible in parallel to meet this cycle budget with minimum bandwidth requirements. Next to the cycle budget, other timing constraints that put limitations on the relative and possibly even absolute ordering can be specified and have to be taken into account during SBO.

SBO is about minimizing conflicts between basic groups. Basic group conflicts are caused by data access conflicts. A conflict graph collects all basic group conflicts, which is then extended towards an extended conflict graph that can be used to optimize memory architectures containing multi-port memories.

Figure 5C:
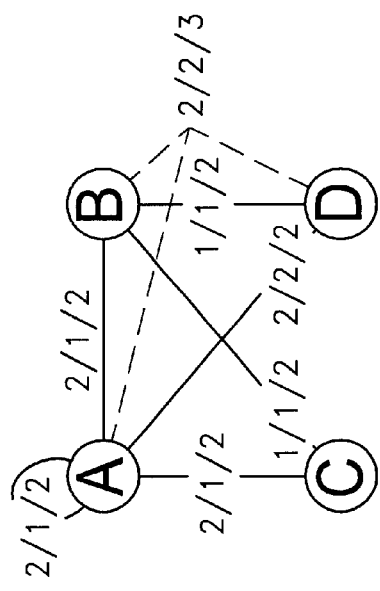
FIG. 5 shows an ordering of data access instructions, being write and read instructions on basic groups A, B, C and D. The related conflict and extended conflict graph are shown.
Figure 5B:
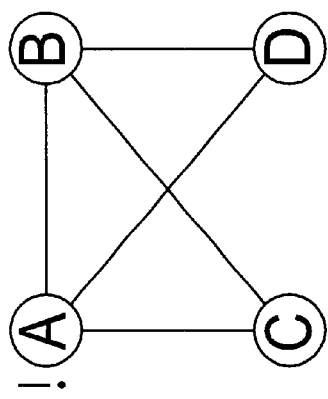
Figure 5A:
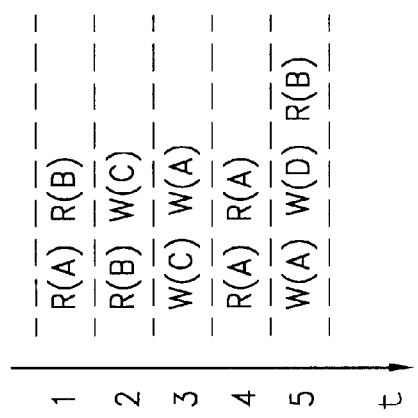

When two data accesses in the CDFG are scheduled in the same cycle (due to stringent cycle budget constraints), it is said that these data accesses are in conflict. In this case, the basic groups they are accessing should be stored in such a way that they are accessible in parallel. This can be done by storing them either in two different memories, or in a memory with at least two ports. Looking at the schedule shown in FIG. 5, it is seen that the data access that reads a value from basic group A in Cycle 1, is in conflict with the data access that reads a value from basic group B also scheduled in Cycle 1. It is said that two basic groups are in conflict, if and only if there exists a cycle in which two data accesses, one accessing the first basic group and the other one accessing the second basic group, are in conflict. Looking at the schedule shown in FIG. 5, it is observed that basic groups B and C are in conflict because they are accessed in parallel in Cycle 2. Therefore, they cannot be stored together in a 1-port memory. Basic groups C and D are not in conflict. Therefore, there is no assignment constraint regarding these two basic groups: if desired, they can be assigned to the same 1-port memory during the memory assignment task. All basic group conflicts are collected in a conflict graph where the nodes correspond to basic groups and there is an edge between two nodes whenever the corresponding basic groups are in conflict. An example of a conflict graph is shown in FIG. 5 for the schedule shown. The exclamation mark next to basic group A in FIG. 5 indicates that the basic group A is in conflict with itself and can therefore not be stored in a 1-port memory. The conflict graphs discussed here can be used only for memory architectures containing 1-port memories. It contains insufficient information for correctly and optimally allocating multiport memories. When also multiport memories are allowed in the memory architecture, extended conflict graphs are preferred.

As will be shown, conflict graphs are important for SBO. They are well known from register and other scalar oriented assignment problems. However, in the invention, the nodes correspond to groups of data instead of scalars. The more conflicts there are between basic groups, the less freedom there is for the memory allocation/assignment tasks. Experiments have shown that this typically results in a higher cost of the memory architecture. Therefore, a cost function for conflict graphs reflecting this is defined in the invention. The idea of SBO is then to come up with a conflict graph with minimal cost such that it is still possible later on (during further design of said digital device) to schedule the CDFG within the cycle budget.

When multi-port memories are allowed in the memory architecture it becomes useful to extend the conflict graph with more information to decide on memory types. Firstly, this annotation includes the type of conflicts that can occur. More specifically, one has to know for every conflict, the maximum number of reads (R), writes (W), and total number of data accesses (i.e. read or write) that can occur (RW) simultaneously. In the figures this information is shown next to the conflict edges Pin the form R/W/RW. This information allows to decide which type of ports (Read, Write, or Read-Write) are required on a multi-port memories when certain basic groups are assigned to it. Secondly, when more than two data accesses are scheduled in the same cycle, this results in a conflict between more than two basic groups which should be accurately represented to guarantee valid solutions in later steps of the design trajectory. This type of conflict can be represented in the conflict graph by hyper edges, i.e., edges between more than two nodes. Finally, it is also possible that a basic group is accessed several times in the same cycle, which results in self-conflict, represented by a self-loop on the corresponding node. Such a conflict forces a multi-port memory to be allocated for that basic group.

All these extensions lead to the definition of the extended conflict graph. An Extended Conflict Graph G(V,S,E,H) is an undirected hyper graph, in which the nodes (V) represent basic groups, and the self-edges (S), binary edges (E), and hyper edges (H) represent access conflicts between the basic groups. Every edge t belonging to the union of S, E and H is labeled with three numbers called R, W, and RW: where R, W, and RW are respectively: the maximum number of simultaneous read operations, the maximum number of simultaneous write operations, and the maximum number of simultaneous data accesses (i.e. read and write operations) that can occur for the given conflict during the execution of the digital devices functionality. An example of an extended conflict graph is shown in FIG. 5 for the schedule shown. The annotations on the edges quantify the type of conflicts that can occur. For instance, it is observed that basic groups B and C are in conflict in Cycle 2, but that there is at most one simultaneous read and one simultaneous write to these basic groups. Therefore, if they are assigned to the same memory, a memory with one read port and one write port is sufficient. Basic group A has a self-conflict in Cycle 4. Therefore, it has be assigned to a multiport memory. Because there are two simultaneous accesses to A, the memory should have at least 2 ports. As there are two simultaneous read accesses to A in Cycle 4, at least two ports should have read capabilities. However, as the is only one simultaneous write access to A in Cycle 3 and Cycle 5, only one port requires write capabilities.

In summary: the cheapest memory in which A can be stored is a 2-port memory, of which one port is a read port and the other port is a read/write port. There is a hyper edge between basic groups A, B, and D. This hyper edge indicates that if all three of these basic groups are stored in the same memory, it should have at least three ports. In contrast, basic groups A, B, and C are also in conflict with each other, but are never accessed all three of them together (there is no corresponding hyper edge). Therefore, they can be stored together in a 2-port memory.

In the method according to the present invention said extended conflict graph, being an undirected hyper-graph, comprising of nodes, representing said basic groups, binary edges, representing data access conflicts between the two basic groups connected by said binary edge, hyper edges, representing data access conflicts between at least three basic groups connected by said hyper edge, and self-edges representing data access conflicts of said basic group connected to itself by said self-edge, is used.

The Extended Conflict Graph represents the constraints that have to be satisfied by the subsequent memory allocation and assignment tasks to be sure that the cycle budget can still be met later on during detailed scheduling. When two basic groups are in conflict, this conflict has to be resolved during memory allocation/assignment. This can be done in two ways: either the basic groups are assigned to two different memories, or they are assigned to a multiport memory. In the latter case, the R/W/RW numbers associated with the conflict determine the number and type of ports that are minimally required on the multi-port memory to which these two basic groups are assigned: the memory must have at least RW ports, of which at least R must provide read capability and at least W must provide write capability. When more than two conflicting basic groups that are connected by a hyper edge in the ECG are assigned to a single memory, the R/W/RW number of the hyper edge determines the number and type of ports that are minimally required on the multi-port memory to which they are assigned.

In the method according to the present invention an extended conflict graph, wherein each of said edges is associated with a triplet of numbers, the first number of said triplet defining the amount of simultaneous data accesses to said basic groups of said edges due to read instructions, the second number of said triplet defining the amount of simultaneous data accesses to said basic groups of said edges due to write instructions and the third number of said triplet defining the amount of simultaneous data accesses to said basic groups of said edges due to either read or write instructions, said triplet being characteristic for an at least partial scheduling of said data access instructions of said functional representation, wherein a partial scheduling comprises of scheduling intervals.

In the method according to the present invention an optimized memory organization is selected, said memory organization satisfying at least the constraints depicted by said optimized extended conflict graph, comprising assigning basic groups being in conflict either to different memories or assigning basic groups being in conflict to a multiport memory having at least a number, defined by said third number, of ports, at least a number, defined by said first number, of said ports, having read capability, and at least a number, defined by said second number, of said ports, having write capability.

The goal of SBO is to come up with an optimized extended conflict graph that puts the least constraints on the search space of the subsequent memory allocation and assignment tasks. To this end, a cost function for extended conflict graphs will be defined such that ECGs with a smaller cost are likely to lead to cheaper memory architectures after memory allocation and assignment. The task of SBO is then to order all data accesses within the cycle budget such that the resulting conflict graph is as cheap as possible.

The extended conflict graph (ECG) contains all relevant information from the data access ordering for the subsequent memory allocation and assignment tasks. Once the ECG is derived, the detailed data access ordering is no longer needed and can be thrown away. The ECG represents an (optimized) set of basic group conflicts that have to be resolved during the memory allocation and assignment tasks. These tasks derive an optimal memory architecture within the constraints expressed by the ECG. Because the ECG is derived from a valid data access ordering, it is guaranteed that there is enough memory bandwidth available to schedule the application within the specified cycle budget afterwards. The data access ordering obtained during the SBO process, is one possible schedule that meets the cycle budget requirements for the memory architecture that satisfies all its constraints. So it is guaranteed that a valid schedule exists. In practice, there are many more schedules compatible with the constraints expressed in the ECG.

Moreover, the memory allocation and assignment tasks usually create even more freedom for the detailed scheduler, as they can assign basic groups that are not in conflict to different memories, thereby allowing that they are accessed in parallel. As the memory architecture, and not the ECG, defines the constraints for) the detailed scheduling step, the final schedule can therefore be quite different from the partial ordering obtained during the SBO task.

Figure 6:
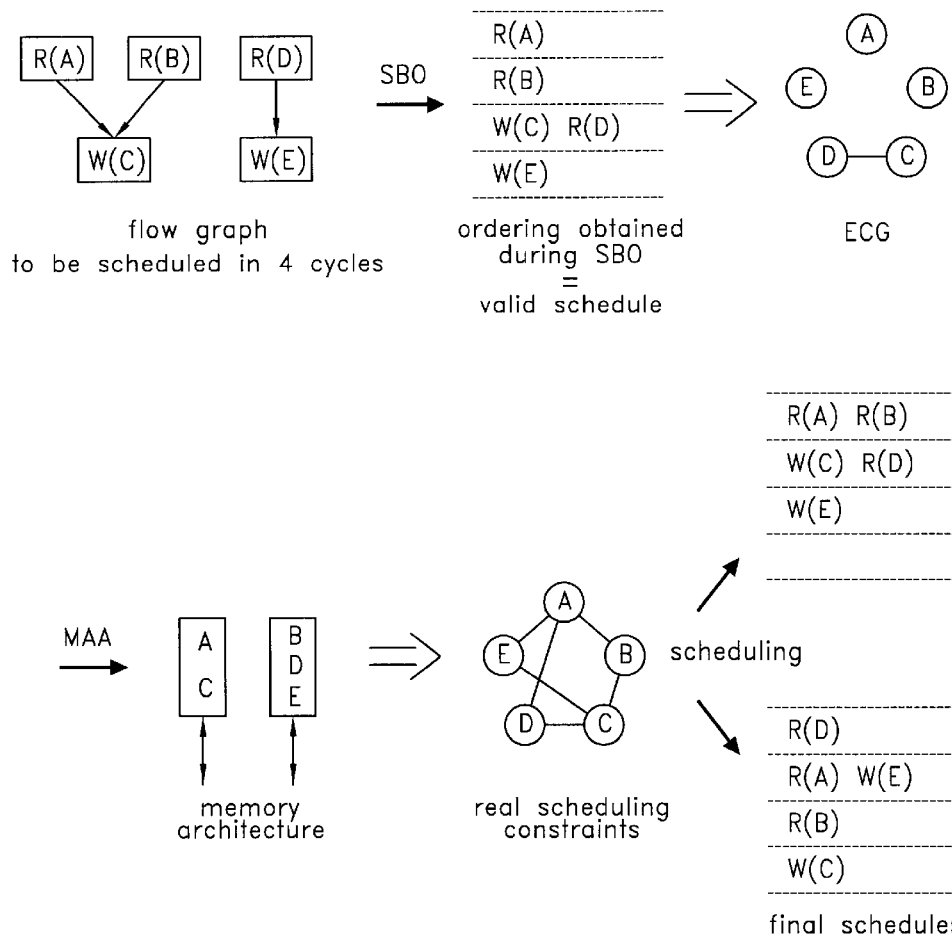
FIG. 6 shows a control flow graph, an ordering of data access instructions obtained during SBO, an extended conflict graph obtained after optimization, a possible memory assignment, the real scheduling constraints related to said memory assignment, and two valid schedules.

In the example of FIG. 6 a control flow graph is given at the top left part of the figure. The top middle part of the figure shows an ordering of data access instructions (read and write instructions on basic groups A,B,C,B,E) obtained during SBO. The extended conflict graph after optimization is shown at the right. Below it is shown that basic groups or signals A and C are assigned to one memory and B,D,E to another. The results in the real scheduling constraints in the middle of the bottom part of the figure. Two schedules are shown at the right, which satisfy this real constraints but obviously also the extended conflict graph constraints. Noticeable is the large differences between the two examples of the final schedule and the ordering obtained during SBO.

From the example, it is learned that the SBO task has to optimize the following three items of the extended conflict graph: the number of self-conflicts, the chromatic number of the conflict graph, and the number of conflicts in the conflict graph. A complete cost function, suitable for optimizing extended conflict graphs is presented.

Clearly, self-conflicts have to be avoided as much as possible because they force the allocation of multiport memories which are very costly both in terms of area and power. Especially, self-conflicts of large and frequently accessed basic groups should be avoided. Therefore, a weighting of the self-conflicts has to be introduced here to make the right trade-offs.

The chromatic number of the conflict graph, i.e. the extended conflict graph without the hyper- and self-edges, corresponds to the minimal number of memories in the memory architecture. This is only exact in case only single port memories are considered. However, as an attempt is made to avoid multi-port memories as much as possible, this is a good approximation. For power reasons only, it is not that important to minimize the number of memories, as distributing the data over smaller memories usually results in lower power dissipation. However, having too many memories in the memory architecture is not good for several reasons (routing overhead, design complexity, test cost, number of I/O pins, etc.). Therefore, it is usually good to try to minimize the required number of memories. During the allocation and assignment tasks, more memories can always be added when this would lead to an important reduction in power and/or area.

To leave as much freedom as possible for the memory allocation/assignment tasks, it is important to come up with an ECG with as few conflicts as possible. Not all conflicts are equally costly, though. For instance, when two basic groups have a large difference in bitwidth, it is not that bad that they have to be stored in different memories, because this saves bits that would otherwise be wasted. This means that such a conflict has to be preferred compared to a conflict between bas, groups with equal bitwidth (especially when the basic group with the smaller bitwidth consists of a large number of words). Another example has to do with power optimization. It can be realistically assumed that a larger memory consumes more power than a smaller memory, and that the power consumption of a memory is proportional to the number of accesses to it. This is confirmed by several memory models that are obtained from vendors. The exact dependence on size is between logarithmic and linear. Therefore, it can be seen that it is not good practice to store a small, very frequently accessed basic group together with a very large, infrequently accessed basic group. Hence, conflicts between these types of basic groups should be preferred over conflicts between basic groups for which there is no reason to store them in different memories.

The previous two examples show that some conflicts have to be preferred compared to others because there is some gain when the two basic groups are stored in different memories. The contrary is also possible: some conflicts haven be avoided more than others. For instance, when two basic groups are part of the same logical structure (e.g. a user defined array is split in two basic groups), it is often better to store both basic groups in the same memory because this reduces the controller and addressing costs. Therefore, conflicts between this type of basic groups should be discouraged, such that the memory assignment task is allowed to store them in a common memory. This justifies the introduction of pairwise basic group conflict costs $C_c$ corresponding to the binary edges e in E of an ECG G(V,S,E,H). These pairwise conflict costs are calculated based on the properties of the two basic groups involved. This is an important difference with the scalar oriented techniques, where all scalars are considered to be more or less equal (although sometimes a distinction is made based on interconnect costs). The pairwise basic group conflict cost can be obtained as a weighted sum of a number of cost terms that depend on the characteristics of the two BGs involved. Some of these cost terms are positive (marked with (+) in the following list), meaning that both BGs are stored preferentially together, others are negative (marked with (−)), meaning that both BG are preferentially stored in different memories. A conflict cost offset is included in the invention in order to make the cost of all conflicts positive.

In an embodiment of the invention the power cost (−) in the pair-wise basic group conflict cost of a binary edge in an extended conflict graph is taken into account in the cost criterion for optimization of the extended conflict graph.

For power reasons it is sometimes better to split the data over different memories. For instance, assigning a small, frequently accessed BG to the same memory as that of a large, infrequently accessed, BG can be bad for power.

In an embodiment of the invention the power cost term in the pair-wise basic group conflict cost of a binary edge of an extended conflict graph, reducing the cost of a conflict between two such BGs is expressed as a term comprising of a first sub-term combining the size of a first basic group of said binary edge with the total amount of data accesses of a second basic group of said binary edge and a second sub-term combining the total amount of data accesses of said first basic group of said binary edge with the size of said second basic group of said binary edge.

In an embodiment of the invention said power cost term in the pair-wise basic group conflict cost of a binary edge of an extended conflict graph is given as follows:

$$\text{Size}(BG_1)*\text{Accesses}(BG_2)+\text{Size}(BG_2)*\text{Accesses}(BG_1)$$

In an embodiment of the invention the bits lost in too wide memories (−) is taken into account in the pair-wise basic group conflict cost in the cost criterion for optimization of the extended conflict graph.

In an embodiment of the invention said bits lost term is a term combining the difference in bit width between said basic groups of said binary edge with the word size of the basic group of said binary edge with the smallest word size;

In an embodiment of the invention in said term the difference in bit width has to be multiplied by the number of words of the BG with the smaller bit width to take the memory loss into account. Because this is a pairwise conflict cost term, it is not easy to prevent overestimating the memory loss when more than two BG are assigned to the same memory.

In an embodiment of the invention the bit lost term is expressed as $$\text{Words}(BG\text{minimal hilwidth})*[\text{BitWidth}(BG_{maximal\ bitwidth})-\text{BitWidth}(BG_{minimal\ bitwidth})].$$

In an embodiment of the invention possible memory sharing (+) is taken into account in the pair-wise basic group conflict cost in the cost criterion for optimization of an extended conflict graph.

Two basic groups can only be stored in-place when they are assigned to the same memory. Therefore BGs with a high possibility of in-place sharing should be allowed to be put in the same memory. This requires early knowledge about which basic groups have non-overlapping life times. This can be provided by tan inter-array in-place estimate.

In an embodiment of the invention said possible memory sharing term comprises a term being a function of the word size of the basic group of said binary edge with the smallest word size when said basic groups of said binary edge having non-overlapping life time and zero otherwise.

In an embodiment of the invention said possible memory sharing term is expressed by the formula: Words($BG_{min\ worddepth}$) if life times are not overlapping and 0 otherwise.

In an embodiment of the invention the cost criterion comprises of a term trying to prevent separating an array of a virtual memory segment (+). This is a fixed cost between every two BGs that are part of the same array/virtual memory segment. Because this is a pairwise conflict cost term, it is not easy to prevent overestimating the possible memory gain when more than two BG are assigned to the same memory.

In an embodiment of the invention the cost criterion has a term being a predetermined positive value when the basic groups of said binary edge are preferably stored in the same memory.

In an embodiment of the invention said splitting preventing term is 1 if BGs are part of the same memory segment and 0 otherwise.

In an embodiment of the invention the cost criterion has a term used to make all conflict costs positive(+). Indeed, if conflict costs would be allowed to be negative, the corresponding conflicts would always be part of the optimized conflict graph because their inclusion would always reduce the total conflict cost. This contradicts the goal of minimizing the number of conflicts in the conflict graph. Hence the cost offset to make sure that conflict costs are always positive.

In an embodiment of the invention said cost criterion comprises a term making the pair-wise basic group conflict cost of all binary edges positive.

It has to be noted that it is not easy to add these totally different costs together (adding "apples and pears") and still get meaningful results. So many experiments have to be done to come up with good weighting factors for these cost terms.

In an embodiment of the invention the cost criterion or evaluation criterion for optimizing the extended conflict graph comprises at least of an estimate of the chromatic number of a conflict graph, being an extended conflict graph without self-edges and hyper-edges, the total amount of data accesses of each of self-edges of an extended conflict graph, and pair-wise basic group conflict costs of binary edges of an extended conflict graph.

In an embodiment of the invention the following cost function for optimizing the extended conflict graph is proposed.

$$Cost(G(V, S, E, H)) = \alpha \cdot \sum_{s \in S} RW_s + \beta \cdot ChromaticNumber(G(V, E)) + \gamma \cdot \sum_{e \in E} C_e$$

The first term penalizes self-edges in the ECG which reduces the number and size of multi-port memories in the final memory architecture, the second term reduces the number of required memories, and the last term minimizes the total weighted conflict cost of the extended conflict graph. The hyper edges are not included in this cost function because SBO it is not known at this stage whether a conflict will be resolved by assigning the conflicting basic groups to different memories or not. An optimistic scenario is assumed here. Only when they are actually assigned to a multi-port memory, the $R_t$, $W_t$, and $RW_t$ values for t belonging to the union of E and H come into play. The hyper edges contain vital information for the memory allocation and assignment tasks, though.

Note that a c-coloring of a graph G is a partitioning of G's nodes in c partition classes $V = X_1 + X_2 + \ldots + X_c$ such that every two adjacent nodes belong to a different partition class. In this case, when the members of partition $X_i$ are colored with color i, adjacent nodes will receive different colors. The chromatic number is the smallest number c for which there exists a c-coloring of G. Obviously, the chromatic number is larger than or equal to the size of the maximum clique of G, since every node of a maximum clique must be contained in a different partition class in any minimum coloring of G. For a perfect graph G, the chromatic number equals the maximum clique for all subgraphs $G_s$ of G.

It must be emphasized that the SBO in accordance with the present invention is done at the level of groups of scalars in such a way that the resulting conflict graph is optimized as opposed to most existing approaches. In addition, the method according to the present invention takes into account which data is being accessed in parallel, instead of only considering the number of parallel data accesses which is done in other approaches. This leads to the optimization of a conflict graph, for which an appropriate cost function has been derived.

In the invention a method for optimizing said extended conflict graph with respect to an evaluation or cost criterion is presented.

Storage-bandwidth optimization is a very complex problem. It is very similar to scheduling for a given cycle budget, which is proven to be NP-complete. Hence, in the invention a heuristic is presented for obtaining near optimal results in a reasonable amount of time for real-life applications. Therefore, in the invents n a heuristic method called conflict directed ordering (CDO) for optimizing the storage-bandwidth of extended conflict graph is proposed. An iterative solution similar to Improved Force Directed Scheduling (IFDS) [W. Verhaegh, P. Lippens, E. Aarts, J. Korst, J. van Meerbergen, A. van der Werf, Improved Force-Directed Scheduling in High-Throughput Digital Signal Processing, IEEE Transactions on CAD and Systems, Vol.14, No.8, August 1995.] is chosen, which leads to very good schedules for a fixed cycle budget. The idea is to gradually refine the scheduling of operations (data accesses here), postponing the definite scheduling of operations as far as possible because then the scheduling of other operations can be estimated more accurately. The conflict directed ordering algorithm operates in an iterative way similar to IFDS. The cost function used in the invention is completely different, however, from the one used in IFDS (because it takes into account which data is being accessed instead of only the number of simultaneous data accesses). Therefore, also the manipulations needed at each iteration are quite different. At every iteration, one of the data access intervals will be reduced by one cycle either at the beginning or at the end of the interval. From all possible interval reduction candidates, the one that has the best effect. on the overall cost is selected.

The iteration process stops when all basic group conflict probabilities are either 0.0 or 1.0, or in other words, when for every possible conflict it is known with 100% certainty whether or not it will occur, because the resulting (extended) conflict graph is of interest. This means that a complete ordering of all data access instructions is not necessary (as opposed to IFDS where the resulting schedule is the final goal).

Figure 7:
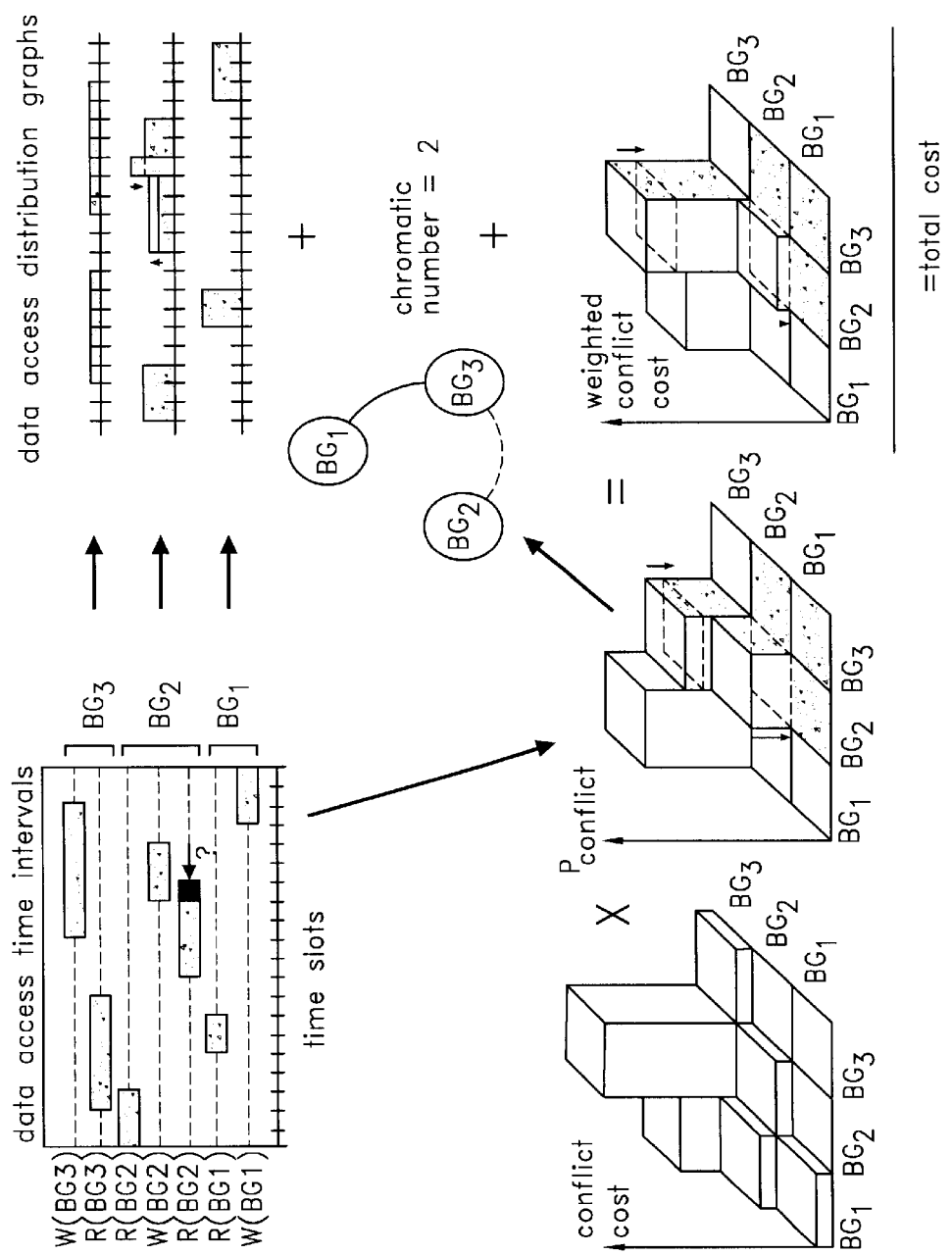
FIG. 7 shows for the data access instructions (write and read) on the basic groups 1, 2 and 3 the data access time intervals. From said data access time intervals the probability of conflicts between basic groups are determined. These probabilities are then multiplied with the conflict costs in order to obtain a weighted conflict cost, being part of the evaluation criterion to be optimized.

FIG. 7 illustrates the CDO algorithm. The diagram in the top left corner of the figure shows for every data access instruction in the CDFG, the interval in which it can be scheduled. These intervals initially result from an ASAP-ALAP analysis of the CDFG and are gradually reduced during CDO. To steer the CDO algorithm towards an optimal solution, a cost function that predicts, from a given set of scheduling intervals, the final cost of the ECG in terms of cost function is used. Hence, the CDO cost function contains also three terms: one for estimating the total weighted conflict cost, one for estimating the chromatic number cost, and one for estimation the self conflict cost. From the information in this diagram, the conflict probability between every pair of data access instructions is computed. These data access conflict probabilities are used to calculate the basic group conflict probabilities for every pair of basic groups ($P_{conflict}$ in FIG. 7). These basic group conflict probabilities are multiplied with their respective conflict costs and summed to get the weighted conflict cost, one part of the CDO cost function. In order to estimate the chromatic number of the current state, real conflicts are needed instead of conflict probabilities. Therefore, a conflict graph is constructed that contains all conflicts corresponding to basic group conflict probabilities above a certain threshold value. The chromatic number of this conflict graph is then taken as an estimate for the bandwidth requirements, the second part of the CDO cost function. To avoid self conflicts as much as possible, data access distribution graphs for every basic group are used. These are balanced using forces similar to those used in force directed scheduling. These forces form the third part of the CDO cost function.

The CDO algorithm uses as inputs the CDFG at basic group level, the set of basic groups with their characteristics and timing constraints including the cycle budget.

Two Preprocessing Steps are Done:

First pairwise BG conflict costs are calculated. From the set of BGs and their characteristics, the pairwise basic group conflict costs are calculated.

Second an ASAP-ALAP analysis is performed on the CDFG to find initial data access scheduling intervals.

After the preprocessing steps, iteration initialization takes place.

First calculating of all data access conflict probabilities is performed. During the conflict directed ordering, a scheduling interval for each data access instruction is available. From these scheduling intervals the probability of a conflict between two data access instructions can be computed.

From the scheduling intervals the probability of an overlap is computed, which equals the conflict probability between the two corresponding data access instructions (for the assumed 10-profile). Not all data access instructions with overlapping scheduling intervals have a conflict probability larger than zero, though. Indeed, when there is a dependency between two data access instructions, one will always be scheduled before the other one, and therefore the conflict probability between these two data access instructions will always be zero. Also, when two data access instructions are mutually exclusive because they belong to two different branches of a condition, their conflict probability is always zero.

Then all basic group conflict probabilities are determined. To calculate the conflict probability between two BGs, all possible overlaps between the scheduling intervals of data access instructions to these BG have to be considered. To make the calculations tractable it is assumed that for every possible overlap, the probability for a conflict is independent from the conflict probabilities of the other overlaps. Under this assumption it is possible to calculate the conflict probability between every two overlapping data access instructions. These conflict probabilities can then be combined to obtain the conflict probability between the two BGs.

Then the chromatic number is determined. Because the chromatic number of a graph weighted with probabilities for the edges is not defined, it is proposed to introduce a threshold probability to obtain an estimate. A conflict graph containing all the conflicts between BGs with a probability above the threshold probability is constructed. The chromatic number is then calculated for this conflict graph.

An initial value of cost function or evaluation criterion is determined.

An initialize set of possible moves is determined. At each iteration of the CDO algorithm one data access scheduling interval is selected and reduced by one cycle, either at the beginning of the interval or at the end of the interval. Only scheduling intervals that can still be reduced (i.e., have a length larger than one cycle) and that can still have an effect on the cost function (i.e., overlap with other scheduling intervals) have to be considered. Each of these intervals leads to two possible moves: a reduction at the beginning or at the end of this interval. All of these are collected in a set of possible moves. During the CDO algorithm this set will shrink until no moves are possible anymore.

Then an iteration is performed until no more moves are possible.

For each possible move, its effect on the cost function is determined in the steps 1,2 and 3:

1 Determine which data access scheduling intervals are indirectly being reduced by the move. Due to dependencies between data access instructions, the reduction of one scheduling interval can force the reduction of other scheduling intervals as well. These indirect scheduling interval reductions affect the cost function in the same way as the direct schedule interval reductions. Therefore, it is very important to take them into account when determining the effect of a possible move.

2 For each data access scheduling interval that is being reduced the change in conflict probability between the data access instruction of which the scheduling interval is being reduced, and all data access instructions that are possibly overlapping, i.e., those having scheduling intervals that overlap with the scheduling interval under consideration before it is reduced, is determined.

3 From the changes in conflict probability between data access instructions, the changes in conflict probability between BGs, are calculated.

If at least one basic group conflict probability crosses the threshold vale for inclusion in the conflict graph, the chromatic number of the conflict graph has to be recalculated.

The effect on the cost function has to be calculated based on the changes in basic group conflict probabilities, and the change of chromatic number of the conflict graph.

Select the move that has the best effect on the cost function, and perform it. Remove from the set of possible moves, all moves that directly reduce scheduling intervals that are not overlapping with other scheduling intervals anymore or that can not be reduced any further. In addition remove from the set of possible moves, all moves that directly reduce scheduling intervals that are only overlapping with intervals of basic groups that are known to be in conflict already. The latter moves have no effect on the cost function anymore but applying them would reduce the scheduling freedom.

As a post-processing step the resulting optimized extended conflict graph is constructed.

Figure 8:
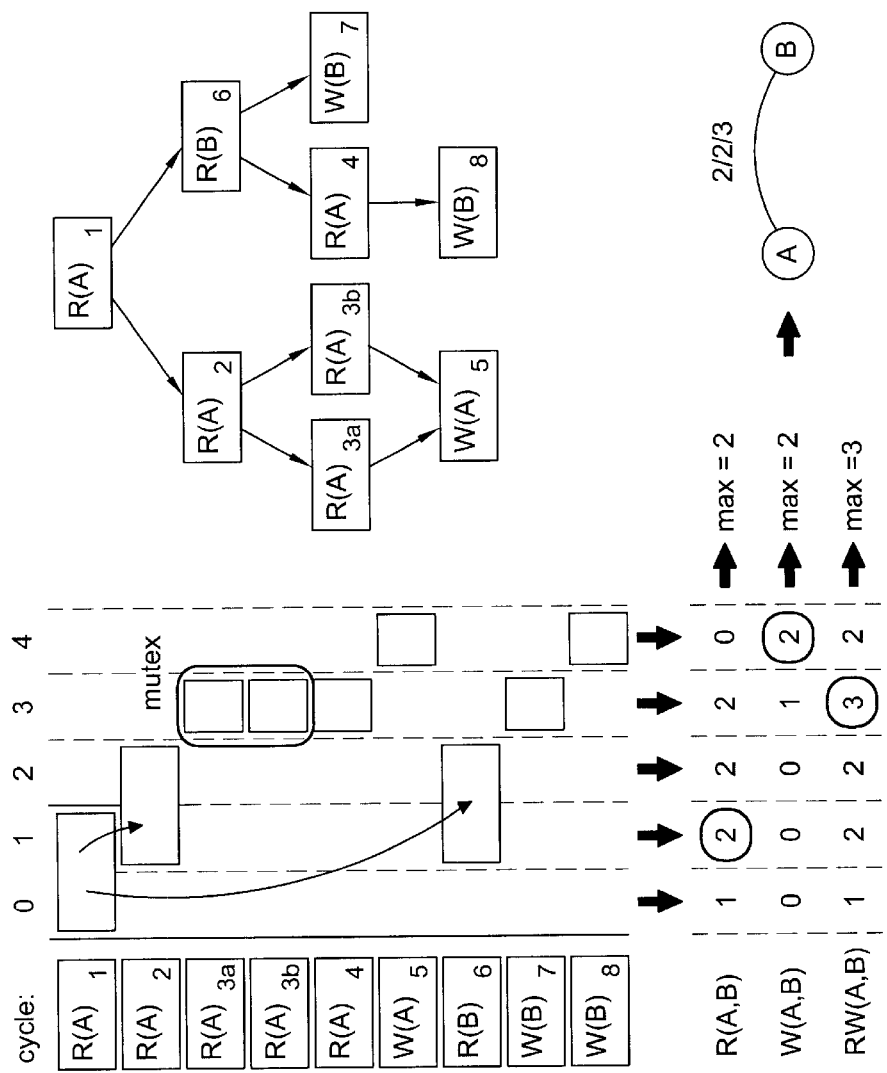
FIG. 8 shows the construction of the optimized extended conflict graph with all the information needed for final selection of a memory organization.

Given the scheduling intervals of all data access instructions in the CDFG, the sets of mutually exclusive data access instructions, and the dependencies between the data access instructions, the maximal number of simultaneous read simultaneous write, and simultaneous data accesses, between every set of basic groups that are in conflict, can be calculated. Not all overlapping scheduling intervals lead to a simultaneous data access because some of these data accesses are performed under mutually exclusive conditions and others are never performed simultaneously because there is a dependency between them, forcing one to be executed after the other. A careful analysis is needed here to obtain each of three numbers: one for the number of simultaneous reads, one for the number of simultaneous writes, and one for the number of simultaneous data accesses. This is illustrated in FIG. 8. If, after conflict directed ordering, there still exist overlapping intervals with length larger than one cycle, they can be reduced further to optimize the R/W/RW numbers on the (hyper)edges in the ECG. This optimization is, however, not of primary importance, as the best solutions tend to avoid multi-port memories anyway. The main output of the Conflict Directed Ordering algorithm is of course the extended conflict graph. The partial ordering obtained during the CDO algorithm can also be written out if desired. Said optimized extended conflict graph can be exploited for selection of an optimized memory organization, which at least satisfies the constraints imposed by the optimized extended conflict graph.

The method according to the present invention for determining an optimized memory organization of a digital device comprises a step wherein optimized scheduling intervals of data access instructions are determined such that execution of the functionality with said digital device being guaranteed to be within a predetermined cycle budget. Furthermore said determining of said optimized scheduling intervals comprising of optimizing an extended conflict graph with respect to an evaluation criterion being related to the memory cost of said digital device. This determining of optimized scheduling intervals comprising of: a preprocessing step being determining initial scheduling intervals with an ASAP-ALAP analysis for each of said data access instructions for each of said basic groups; a first iteration initialization step being determining initial basic group conflict probabilities; a second iteration initialization step being determining an estimate of the chromatic number of a conflict graph, being an extended conflict graph without self-edges and hyper-edges, with basic group conflicts with a probability above a predetermined threshold value; a third iteration initialization step being determining an initial value for said evaluation criterion by at least incorporating said chromatic number estimate and combining said initial basic group probabilities with said pair-wise basic group conflict cost, a fourth iteration initialization step being determine an initial set of possible scheduling interval one cycle reductions, each of said reductions being related to a data access instruction having a scheduling interval of at least two cycles and having a scheduling interval being overlapping with at least one other scheduling interval of data access instruction; a first step of the iteration being determining for each reduction of said set said evaluation criterion, taking into account changes in the basic group conflict probabilities and recalculating said chromatic number when due to said reduction at least one basic group conflict probability traverses said predetermined threshold value; a second step of the iteration being selecting from said set a reduction with the best effect on said evaluation criterion; a third step of the iteration being executing said selected reduction on at least said related data access scheduling interval; and a last step of the iteration being modifying said set.

Considering scheduling intervals that are gradually reduced until the desired result is obtained is an idea taken from IFDS. The cost function used to determine which scheduling interval has to be reduced at each iteration is fundamentally different, though. This leads to a different optimization methodology. The main difference is that the cost function of the invention takes into account which data (in terms of BGs) is being accessed in parallel, whereas IFDS only takes the number of parallel data accesses to reduce the required memory bandwidth. This allows for a much more global optimization compared to IFDS. For instance, when the decision is taken to schedule two data accesses in the same time slot this involves a certain cost (called the conflict cost), because the two corresponding BGs have to be stored either in two separate memories or in a multi-port memory. However, once this decision is taken, data accesses to these BGs can be scheduled in parallel many times without any additional cost. Therefore, this cost should be counted only once, which is done in CDO, but is impossible in (I)FDS because it does not take into account which data is being accessed. Optimizing the total conflict cost is a global optimization, whereas balancing the number of simultaneous data accesses is a local optimization which can be very bad globally. So, one very important advantage of CDO over IFDS is that CDO takes into account conflicts between BGs whereas IFDS does not. Using the properties of the BGs, it is possible to weigh the conflict costs for every pair of BGs because some BGs are preferentially stored together while others are preferentially stored in separate memories. This is again an important advantage over IFDS where all data is treated equally. Another important difference is that the chromatic number of the conflict graph is taken into account. Again, this is done in order to have a more global optimization of the memory cost. Indeed, the required number of memories cannot be estimated accurately by looking locally only, as is done in IFDS, because all conflicts of the whole algorithm have to be considered for this. It should be clear by now that in the invention it is tried to optimize global measures (i.e. the total conflict cost and the size of the chromatic number of the conflict graph) of the algorithm, instead of locally balancing the CDFG by means of forces as is done in (I)FDS. Only for minimizing the number of simultaneous accesses to the same basic group (self conflicts), the same forces similar to IFDS are used. The difference here, however, is that in the invention balancing the number of simultaneous accesses per basic group is done, whereas IFDS balances the total number of simultaneous accesses. The resulting amount of self-conflicts can still be very bad in the case of IFDS, forcing the use of multi-port memories with an excessive amount of ports. Another difference between IFDS and CDO is that the goal of the former is an optimal schedule, whereas the goal of the latter is an optimal conflict graph. This also leads to a different stop criterion for both algorithms: IFDS stops when everything is fully scheduled, CDO stops when for all possible BG conflicts it is known whether or not it is needed to meet the cycle budget constraint. Usually this means that CDO can stop before a full ordering is obtained.

Some useful extension of the methods described above are now presented. In an embodiment of the invention in said methods, said optimized extended conflict graph is forced to contain user predefined conflicts.

In an embodiment of the invention in said methods, some basic groups are forced to be in the same memory by clustering said basic groups in a clustered basic group. Said cluster basic group has a properties that its word depth is estimated by high-level in-place techniques taking into account the word depths of the BG's it replaces and the life-times of these BG's. Its bitwidth is the maximum of the bitwidths of the BG's it replaces. The average number of the read/write instructions (data access instructions) is the sum of the average number of the read/write; instructions it replaces.

In an embodiment of the invention a partial pre-assignment of some basic groups to memories before SBO is performed is foreseen.

In another embodiment of the invention a partial pre-allocation, being specifying a number of memories that should be present in the final memory hierarchy.

In an embodiment of the invention multiple control data flow graphs are optimized with respect to a common extended conflict graph.

The solution presented above does a good job in deriving accessibility constraints for flat control flow graphs, representing applications with no loops and no data dependent conditions, for which the cycle budget is known beforehand. It cannot, however, be directly used for distributing the cycle budget over different loop bodies of the application because of the complexity explosion.

In an embodiment of the invention storage-bandwidth optimization methodology for data-dominated applications containing loops and data dependent conditions is presented. It also explicitly makes use of the presence of manifest conditions. For such applications the available storage cycle budget has to be distributed over the different loop nests in said application. Some loop bodies are executed much more often than others. Providing simultaneous accessibility for data accessed in frequently executed loop bodies has a much larger effect on the cost of a memory architecture than for data accessed only in infrequently executed loop bodies.

The proposed low complexity approach is to do a pre-processing step, performing a good storage cycle budget distribution. Then the SBO for flat CDFGs can be used to do further optimize the obtained accessibility constraints. The storage cycle budget distribution (SCBD) algorithm decides how the cycle budget will be distributed over the different pieces of the CDFG (blocks). This has a large effect on the conflicts that will appear in the conflict graph. The application, code can be considered to be partitioned into blocks corresponding to function bodies, loop bodies, and conditional branches. Each statement of the code belongs to one and only one block. Hence, statements belonging to nested blocks are not considered to be part of the enclosing blocks.

Said embodiment provides a method for determining an optimized memory organization of an essentially digital device is presented. Said digital system being represented by a representation, describing the functionality of said digital device. Said representation is divide in disjunct blocks. Said representation comprises data access instructions on basic groups, being groups of scalar signals. Before performing optimized scheduling intervals and an optimized memory organization, the predetermined cycle budget will be distributed over said blocks. This imposes additional constraints for the step which performs determination of optimized scheduling intervals of said data access instructions. Said constraints can be denoted block cycle budget constraints. Or one can state that the execution of each of said blocks must be guaranteed to be within its corresponding block cycle budget.

Therefore, the method according to the present invention, further comprises the steps of:
  decomposing said representation in a plurality of disjunct blocks;
  determining a block cycle budget for each of said disjunct blocks. and said
  determining of optimized scheduling intervals being such that execution of
  each of said blocks being guaranteed to be within its block cycle budget.

Figures 9A, 9B:
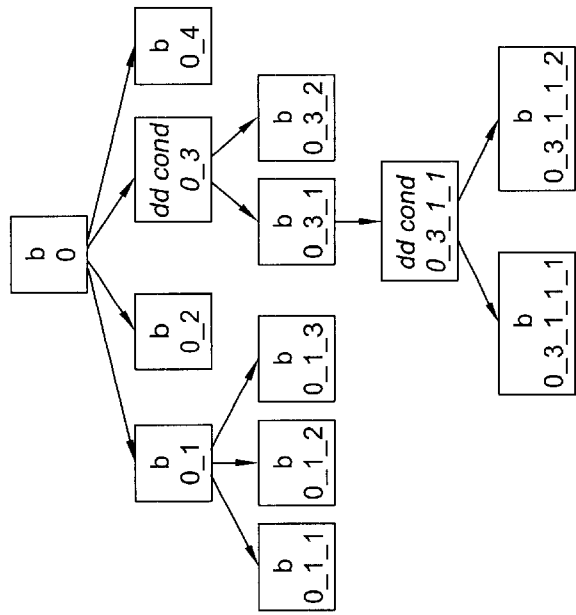
FIG. 9 shows the partitioning of a representation of the functionality of a digital system under construction in disjunct blocks and a possible structuring of said blocks in a tree with indications of data-dependent conditions.

The left hand side of FIG. 9 shows the block partitioning on an example. Together, the blocks form a hierarchical partitioning of the CDFG that can be represented as a tree. This is shown by the right hand side. The tree also contains special nodes for the data-dependent conditions. Assuming nicely structured code in which every block has a single entry and exit point, every statement of a block is executed under exactly the same conditions as the other statements of that block. Consequently, he number of times a statement is executed is the same for all statements belonging to the same block. Hence, the number of times a block is executed can be defined.

In an embodiment of the invention a method for determining a block cycle budget for each of said disjunct blocks is presented (SCBD algorithm). The method for determining a block cycle budget for each of said disjunct blocks comprising the step of determining an allowed-conflicts graph with respect to an evaluation criterion being related to the memory cost of said digital device.

In said method the following concepts are exploited. The allowed-conflicts graph is a graph that represents all conflicts that are allowed at a given iteration of the SCBD algorithm. In each iteration, the SCBD algorithm considers only data access orderings of which all conflicts are contained in the then current allowed-conflicts graph. The schedule length (SL) of a block is the minimum number of cycles required to execute all data access instructions of the block given that only conflicts that are represented in the allowed-conflicts graph are allowed to occur. The allowed-conflicts graph changes from iteration to iteration. The total schedule length (TSL) of the application is the minimum number of cycles required to execute all data access instructions of the application given that only conflicts that are represented in the allowed-conflicts graph are allowed to occur and that blocks cannot be scheduled in parallel.

The strategy for the storage cycle budget distribution step consists of three substeps. First, the code is divided into blocks. Then, the total schedule length of the algorithm is determined as a function of the schedule length of the individual blocks. Finally, conflicts are added in an iterative way to an allowed-conflicts graph, until the cycle budget requirements can be met in a cost effective way. The method can be applied with worst case as well as average case assumptions for the data-dependent behavior.

Each of the steps is briefly described illustrated on a small example shown in FIG. 10.

First divide the application code into blocks. To distribute the cycle budget over the code, the CDFG is divided into blocks. Each of these blocks will be assigned a number of cycles, from the total cycle budget, in which it has to be scheduled. Next to splitting the CDFG into sub FGs corresponding to the blocks, this first substep also determines how often each of the blocks will be executed during one iteration of the algorithm. In case of data dependent conditions and/or loop bounds, worst case numbers have to be determined.

Secondly, determine TSL as a function of SLs of all blocks. Once the blocks and the number of times they will be executed are known, the TSL of the application can be determined as a function of the SLs of the individual blocks. In case there are no data dependent conditions, the TSL is simply the sum of the SLs. of each of the blocks multiplied with the number of times they are executed. The SL of a data dependent condition is determined by the largest SL of each of its branches. Therefore, each data dependent condition will introduce a maximum-operator in the function describing the TSL of the algorithm.

Thirdly, iteratively add conflicts to allowed-conflicts graph, until the cycle budget is met. The allowed-conflicts graph represents the constraints for scheduling the application. Hence, adding conflicts to it allows for potentially shorter schedules because of the relaxed scheduling constraints. The general idea behind the storage cycle distribution step is to add, one by one, new conflicts to the allowed-conflicts graph until a valid schedule with minimum cost within the cycle budget is possible.

Figures 11, 11A:
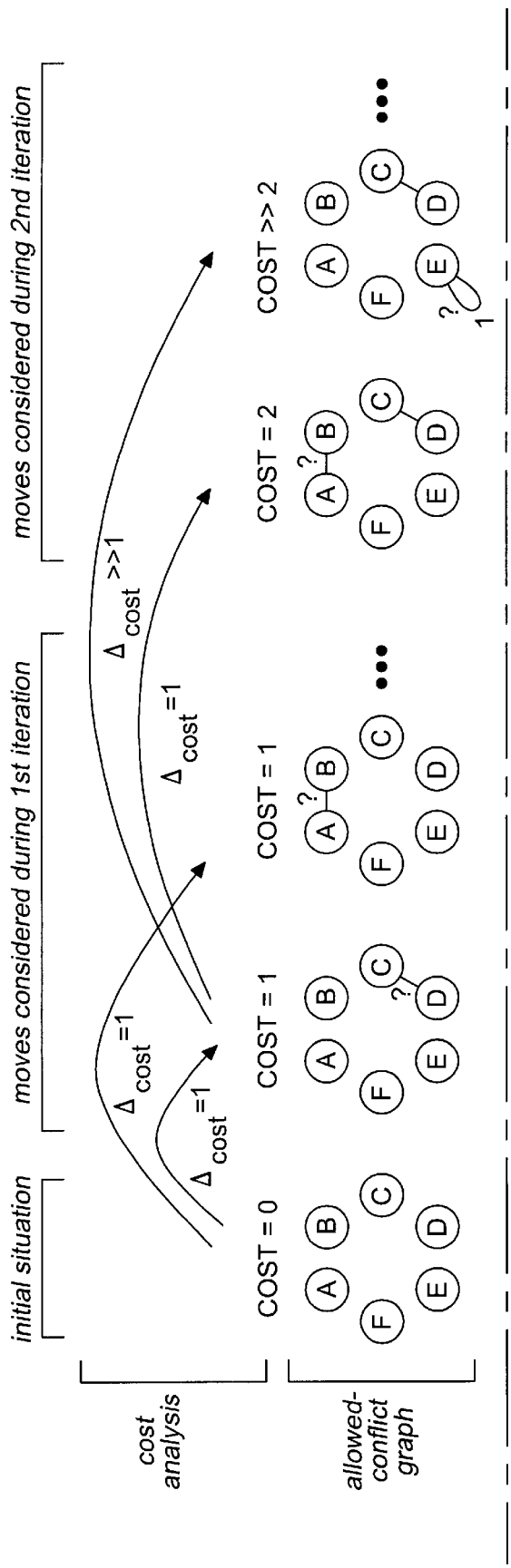
FIG. 11 illustrates the storage cycle budget distribution method. Starting with an initial situation with an empty allowable conflict graph, potential conflicts are examined with respect to an evaluation criterion and the scheduling gain obtained. Then one conflict is added to the allowable conflict graph, and a next iteration is started until the functionality of the device can be executed or scheduled within the predetermined cycle budget. The resulting block cycle budget are then potentially used in a further storage bandwidth optimization step.
Figure 11B:
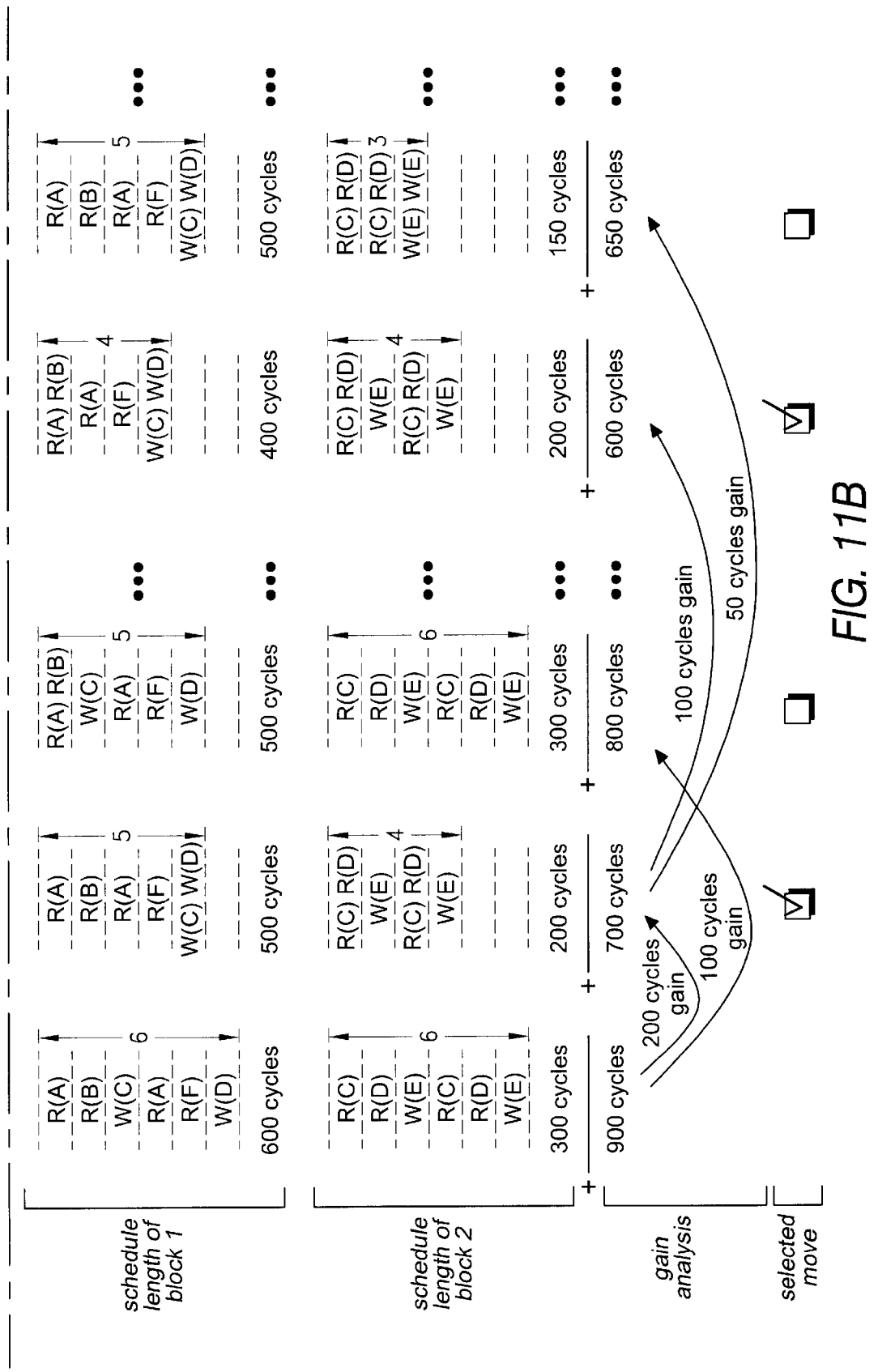

FIG. 11 illustrates this for the code fragment of FIG. 10. The optimization process starts with an empty allowed-conflicts graph At every step in the iteration, the cost of adding a conflict to the allowed-conflicts graph is calculated for every candidate conflict that is not already in the graph. Next to its cost, also its effect on the TSL of the application is determined, i.e., the gain of adding this conflict to the allowed-conflicts graph. The conflict that has the highest gain-to-cost ratio will be added. This process continues until enough conflicts have been added such that the TSL fits within the cycle budget.

It can be said that said determining of an allowed-conflicts graph with respect to an evaluation criterion being related to the memory cost of said digital device comprises the steps of: determining an empty allowed-conflict graph, determining a set of conflicts; 1 determining for each conflict in said set a conflict cost and the gain on the cycle budget of the application; 2 adding the conflict with the highest gain-to-cost ratio to said allowed-conflict graph; 3 modifying said set of conflicts; and repeating the steps 1 to 3 until the cycle budget is below a predetermined value.

In case there is data dependent behavior in the algorithm or application to be executed by the digital device under construction, the execution time can vary from iteration to iteration. The way to deal with this depends on how strict the cycle budget is.

In case of a strict cycle budget, all possible executions must fit within the cycle budget: the worst case behavior has to be taken into account. The data dependent behavior has to be dealt as follows: For data dependent loop boundaries (e.g., while-loop) worst case boundaries have to be used in order to guarantee that the cycle budget will be met under all circumstances. For data dependent conditions all oaths have to be scheduled within the cycle budget. The TSL of the application is equal to the longest path. This leads to a maximum-operator in the function of the TSL for every data dependent condition in the CDFG (control data flow graph). For data dependent indexing no problems are caused as long as the basic groups satisfies some basic group properties.

In case of a flexible cycle budget, being the case if one wants to bound the average or typical execution time of the algorithm. In this case it is allowed that for some input data the cycle budget is not met. The data dependent behavior has to be dealt with as follows:

For data dependent loop boundaries (e.g., while-loop) for each block, the average or typical number of times it will be executed has to be used in the calculation of the TSL of the algorithm. For data dependent conditions for each branch, the average or typical number of times it will be executed has to be used in the calculation of the TSL of the algorithm. This number can be specified as an absolute number (e.g., branch b is typically executed 90 times) or relative to the parent bloc (e.g., branch b is typically selected 90% of the time). The contribution of each branch to the TSL is simply accumulated, no maximum-operator is needed in this case. For data dependent indexing, again this causes no problems as long as the basic groups satisfy the properties of basic groups.

To summarize: the blocks are treated similarly to manifestly executed blocks. The only difference is that the number of times they will be executed has to be obtained from the user or via simulation instead of from an analysis of the code.

It is, of course, possible to optimize the worst case of some data dependent conditions, and optimize the average or typical case of other conditions in the same application.

To calculate the number of times a block is executed, two cases have to be distinguished: the case in which this number is completely manifest, and the case in which it is data dependent. It is completely manifest, if the block and the enclosing blocks (i.e., all blocks that are on the path in the block hierarchy tree leading from the root block to the block considered) correspond only to manifest conditions and loops with manifest boundaries. Otherwise it is data dependent.

In case the number of executions is manifest, it can be obtained by counting the number of points in the iteration domain corresponding to the block. Indeed, each point in a block's iteration domain corresponds to a single execution of She block.

The following definitions can be used: The iteration space of a loop nest L is a discrete space defined by the iterators of L. With every iterator corresponds one discrete dimension: only values that can be assumed by the corresponding iterator (making abstraction of its upper and lower bounds) are part of it. Combined, these dimensions form the iteration space of L. The iteration domain of an instruction I inside a loop nest L is the set of points from L's iteration space that satisfy all loop bounds and possible manifest conditions that enclose I.

If no data-dependent conditions enclose instruction I, it will be executed exactly once for every point in its iteration domain. If data-dependent conditions enclose instruction I, it will be executed (at most once) for every point in its iteration domain. So, in the latter case, the iteration domain corresponds to the worst case execution of instruction I.

The data space of an array A is a discrete space with dimension equal to the number of dimensions of A and infinite size. Every access to array A addresses one point of A's data space. The data domain of an array A is the set of points of A's data space that can possibly be addressed by access instructions in the application. The operand domain of a read instruction R accessing array A is the set of points of A's data domain that can possibly be accessed by R. The definition domain of a write instruction W accessing array A is the set of points of A's data domain that can possibly be accessed by W.

Figure 12C:
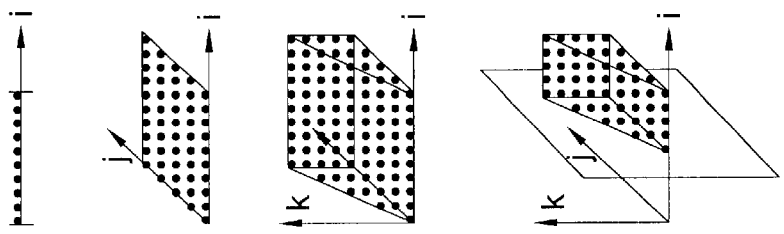
FIG. 12 illustrates the calculation with an example. It shows the iteration domains for a number of blocks of the code shown on the left. The iteration domain of a block is determined by all loops and conditions corresponding to the block itself and those enclosing it Each of these loops adds a discrete dimension to the iteration space. Combined, these dimensions form a discrete iteration space, where all elements lie on a grid. Each loop also introduces bounds for the dimension it defines (via the loop bounds). Each condition introduces additional constraints for the iteration domain. The part of the iteration space that fits within all bounds specified by the loops and the conditions is the iteration domain of the block.
Figure 12B:
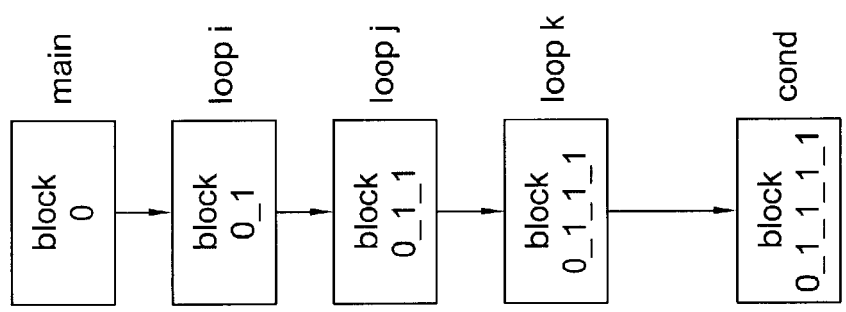
Figure 12A:
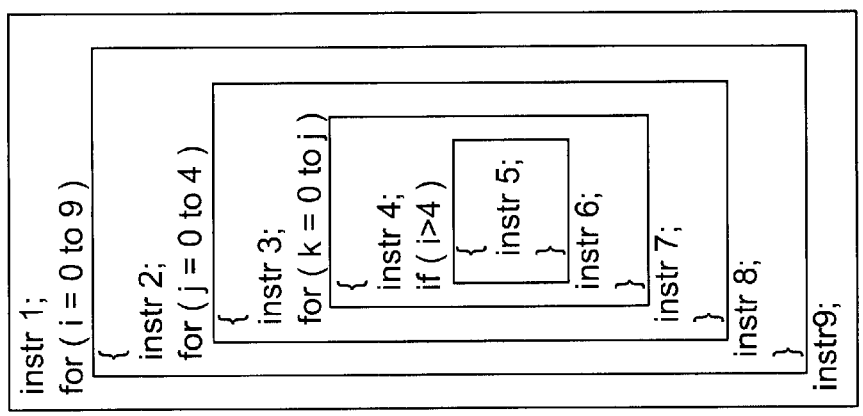

FIG. 12 illustrates the calculation with an example. It shows the iteration domains for a number of blocks of the code shown on the left. The iteration domain of a block is determined by all loops and conditions corresponding to the block itself and those enclosing it Each of these loops adds a discrete dimension to the. iteration space. Combined, these dimensions form a discrete iteration space, where all elements lie on a grid. Each loop also introduces bounds for the dimension it defines (via the loop bounds). Each condition introduces additional constraints for the iteration domain. The part of the iteration space that fits within all bounds specified by the loops and the conditions is the iteration domain of the block. In general, it is a geometrical shape in the block's discrete iteration space. The number of points that lie within this shape is the number of times the block is executed. This number can be calculated with a Fourier-Motzkin based technique even if complex but manifest conditions and indices are present. Alternative ways of calculating this exists.

Two different approaches for determining the number of executions are possible if it is data dependent. The appropriate approach depends on how strict the cycle budget is: If the cycle budget is strict, the analysis is the same as in the manifest case, except that worst case loop boundaries have to be used, and that data dependent conditions do not have to be considered. Indeed, in a worst case analysis, one has to assume that the expression that evaluates whether or not a data dependent conditional branch has to be executed always evaluates to true (i.e., the conditional branch will be executed). So, data dependent conditions do not restrict the iteration domain in any wary. Note that the fact that conditional branches are mutually exclusive is taken into account in the calculation of the TSL of the application.

If the cycle budget is flexible, additional information is required to determine the number of executions. This information must be supplied by the user or be obtained from simulations. Two options are possible. The number of executions can be specified as an absolute number for the block. In this case, no further analysis is needed, of course. Alternatively, the number of executions of a block can be specified relative to that of its parent block, by means of a multiplication factor. This factor is larger than 1 for data dependent loops, and smaller than 1 for data dependent conditions. In this case, the number of executions of the parent must be calculated first. The number of executions of the block itself is then be obtained by multiplying this with the supplied multiplication factor.

Given the number of times a block is executed, it is easy to calculate the number of times a given basic group is accessed within that block. This is done by multiplying the number of times the block is executed with the number of data access instructions within the block that access the given basic group. Indeed, the basic groups are defined in such a way that each execution of a data access instruction accesses its corresponding basic group exactly once, irrespective of the indexing.

Determining the minimum number of cycles in which a block clan be scheduled using only the conflicts in the allowed-conflicts graph is a very important task in storage-bandwidth optimization for hierarchical graphs. Moreover, as it will be executed very often during SBO, its execution time should be as short as possible. Therefore, a fast list scheduling algorithm seems to be the best solution, especially for the blocks that are executed relatively infrequently and therefore having little impact on the TSL of the application. For the main contributors to the cycle budget, i.e., the blocks that are executed very often, a more accurate estimate may lead to better results. For this purpose, (improved) force directed list scheduling or la variant of ILP scheduling are good candidates.

Given the block hierarchy tree, and the number of times each block is executed, the TSL of an application can now be easily calculated as la function of the SLs of the individual blocks, as explained below.

The TSL of a block is the total number of cycles required for executing this block and the blocks it encloses (i.e., its child blocks and below) during one iteration of the application. It is the sum of the total number of cycles spent in the block itself, plus the TSL of its child blocks and the TSL of its child conditional branches:

$$TSL(b_i) = \#(b_i) \cdot SL(b_i) + \sum_{\substack{child \\ b_j}} TSL(b_j) + \sum_{\substack{child \\ cond_k}} TSL(cond_k)$$

In case of a worst case analysis, the TSL of a data dependent condition, is the maximum of the TSLs of each of the blocks that correspond to its branches.

$$TSL(cond_k) = \max_{\substack{child \\ b_l}} TSL(b_l)$$

Figure 13B:
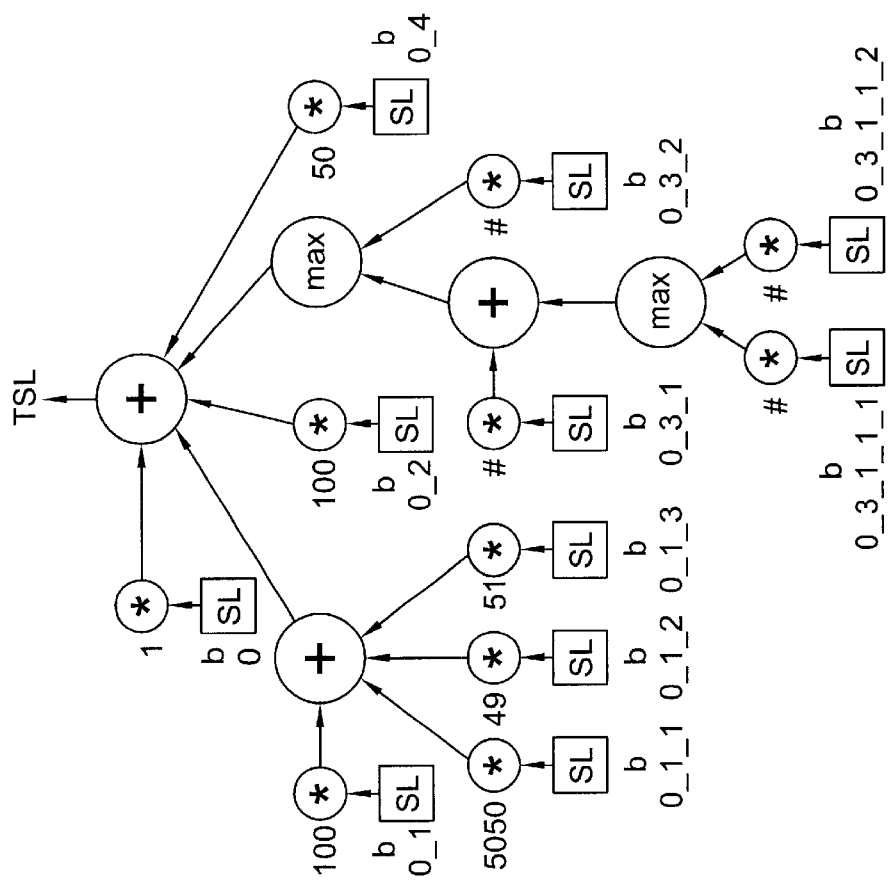
FIG. 13 illustrates how the total formula for the total schedule length (TSL) of the application can be obtained from the block hierarchy tree.
Figure 13A:
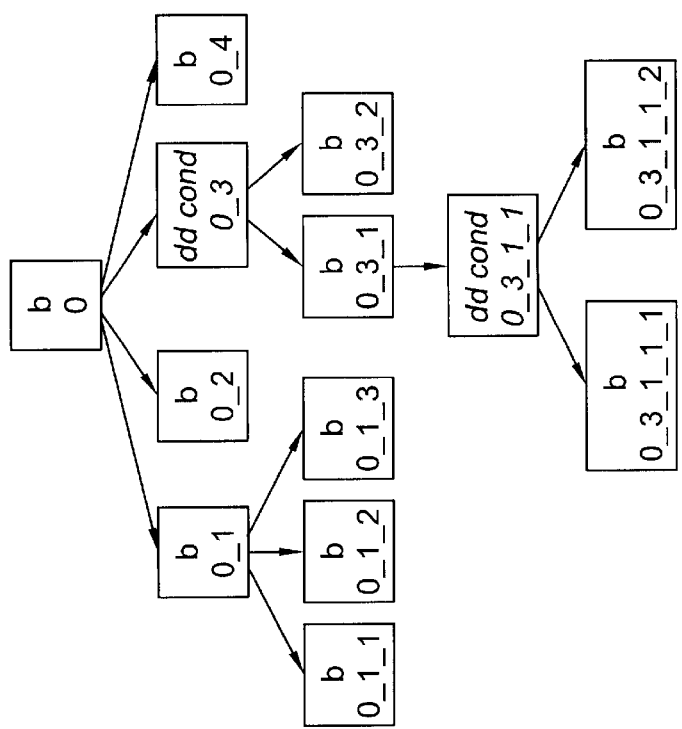

Otherwise, the data dependent conditions should be treated the same way as the manifest conditions, i.e., each conditional branch becomes a normal block. No maximum operator is needed in this case. The TSL of the application is simply the TSL of the root block: FIG. 13 shows how the total formula can be obtained from the block hierarchy tree in which the data dependent conditions are explicitly represented by a conditional node. Each block node is replaced by a sum-operator. One input to this sum operator is the block's SL multiplied with the number of times it is executed (shown for data dependent numbers). The other inputs to the sum-operator come from the block's children. The conditional nodes have to be replaced by a maximum-operator that takes the maximum of all its branches.

Now also the reason for explicitly modeling the data dependent conditions in the block trees can be explained. For calculating the TSL of such a condition the mutual exclusiveness of its branches has to be taken into account. This means that they cannot be treated independently. Hence the conditional nodes that indicate that their children are in fact mutually exclusive. In the used formula the SL of the blocks takes into account which data access instructions can be scheduled in parallel. Moreover the IO-profile of the data access instructions is taken into account as well.

The Storage Cycle Budget Distribution algorithm takes as inputs the CDFG at basic group level, the set of basic groups with their characteristics, and the timing constraints including the cycle budget.

First a preprocessing step is performed in which the set of BGs and their characteristics, the pairwise basic group conflict costs are calculated. Also IO-profile assignment is performed, which assigns an IO-profile to each BG based on the memory hierarchy level to which it has been assigned. The IO-profile determine the minimum number of cycles that have to be scheduled between two data accesses that have a data dependency between them. Preprocessing also includes block partitioning, which partitions the control data flow graph into blocks. The number of times each block will be executed has to be determined as well. Then a data flow analysis per block is performed, constructing for every block, an abstract FG containing only data access instructions to basic groups and dependencies between them. Embedded blocks (at a lower level in the hierarchy) are represented by block nodes. Dependencies that flow through such an embedded block are represented as dependencies to/from the corresponding block node. block nodes cannot be scheduled in parallel with any other node (including other block nodes). The critical path length and the number of data accesses for every block are also determined. Also the TSL of the application as a function of the SLs of the individual blocks is determined.

Second an iteration initialization step is performed in which conflict candidates are determined. For each block, determine all possible conflicts. Combine them into a set of conflict candidates for the application as a whole. Then create an empty allowed-conflicts graph for the application.

Thirdly an iteration is performed. Said Iteration continues as long as the TSL is larger than the wanted cycle budget.

In each iteration for each conflict candidate perform the steps of: calculating the cost of adding the conflict to the allowed-conflicts graph. The only part of the cost function that has to be recalculated is the chromatic number of the resulting conflict graph; calculating the gain of adding this conflict to the allowed-conflicts graph. The gain is defined as follows:

min (TSL−TSL', TSL−CB), where TSL is the current total schedule length, TSL' is the total schedule length if the examined conflict would be allowed, and CB is the cycle budget. The second part of the min operator assures that the gain cannot become larger than what is needed to get within the required cycle budget.

Then for each block of which the SL can still be reduced, an that can not be reduced by allowing a single additional conflict perform the steps of calculating a set of conflicts of minimal cost such that the SL of that block can be reduced by (at least) one cycle. This can be done with an extended version of SBO for flat graphs (as defined by the other embodiments of the invention) that accepts pre-defined conflicts. This immediately gives the cost of adding this set of conflicts to the allowed-conflicts graph; calculating the gain of adding this set of conflicts to the allowed-conflicts graph.

The final step of each iteration is to add the conflict or set of conflicts with the highest gain-to-cost ratio to the allowed-conflicts graph.

Finally there can be a post-processing step wherein the extended conflict graph is constructed. The construction of the extended conflict graph is the same as for the CDO algorithm. The main output of the SCBD algorithm is of course the extended conflict graph. The cycle budget distribution over the different blocks and the full ordering obtained during the CDO algorithm can also be written out if desired.

In practice, many calculations are the same from iteration to iteration. Hence, the calculations can be performed incrementally: only recalculate the data that has changed between two consecutive iterations.

In an embodiment particular groupings of scalar signals into basic groups are proposed. To deal with realistic applications, the memory assignment task, being one of the tasks in the determining of an optimized memory organization, should assign groups of scalars to memories instead of individual scalars. These groups of scalars are called basic groups (BGs). They form a partitioning of all data that has to be stored in background memory. This partitioning is decided early in the design script of the digital device or system under consideration, and is done in such a way that for every data access (read or write) in the flow graph it is known which basic group is being accessed. Indeed the application to be executed in said digital system, is represented by data access instructions on basic groups, being groups of scalar signals. Basic groups are in principal defined by the following set of properties, although from a practical point some deviations from said properties are allowable.

Property 1: The set of all basic groups forms a partitioning of the data that has to be stored in background memory, i.e., every data item belongs to one and only one basic group. During the memory assignment phase, each basic group will be assigned to an allocated memory.

Property 2: The partitioning into basic groups is manifest, i.e., it is decided at compile time. This means that the data to memory assignment can also be decided at compile time.

Property 3: Every Read/Write instruction, generally defined H as data access instructions, in the algorithm accesses one and only one basic group. Thus, after basic group to memory assignment, every Read-Write instruction in the algorithm is associated with exactly one physical memory. This is an extremely important property that has a number of important consequences: firstly, a basic group is a set of full data words, because a read or write instruction always accesses a complete data word; secondly, this property determines which data can be stored in different basic groups and which data can not.

Property 4: The basic groups are as small as possible, i.e., they contain as few data items as possible. This property is not really necessary, but maximizes the possibility for parallel data accesses and the freedom for the memory allocation; and assignment tasks. It also makes the basic group partitioning unique for the; given algorithm description or representation. The size of each basic group is lower bounded by the previous property.

In the case of multi-dimensional signal processing applications, the basic groups are (parts of) multi-dimensional arrays. In the case of network applications, the basic groups are (parts of) virtual memory segments.

The SBO and memory allocation tasks operate on the same basic groups as the memory assignment task which can be defined very early in the global DTSE script. Therefore, the SBO task takes the set of basic groups as one of its main inputs. The set of basic groups is determined early in the overall design flow as it is used by several tasks in DTSE methodology (e.g. SBO, memory allocation and memory assignment). Hence, the SBO task takes the set of basic groups as input, together with a characterization of each basic group in terms of: word depth, i.e., the number of words in the BG, bit width, i.e., the number of bits in one word of the BG, average number of read accesses during 1 iteration of the algorithm, average number of write accesses during 1 iteration of the algorithm, and storage level in the memory hierarchy.

In a further embodiment basic groups are defined for data-dominated real-time applications having flat control data flow graphs, i.e., containing data-dependent conditions but essentially no loops. An important class of applications that fits this category are the network component applications operating on the layers 3 to 6 of the OSI network layer model. These applications typically handle large amounts of data organized in dynamically allocated tables and records. Said applications exploit virtual memory management techniques and define virtual memory segments. They usually have a strict cycle budget in which they have to be scheduled. Storage-bandwidth optimization determines which groups of data should be made simultaneously accessible in the memory hierarchy such that the real-time constraints can be met with minimal memory cost. A custom data flow analysis for partitioning (grouping) the dynamically allocated background data into basic groups is explained.

The data flow analysis task defines the basic groups and derives a maximally parallel control data flow graph at the basic group level. A virtual memory segment (VMS) is a chunk of memory allocated for storing data. In case of dynamically allocated data, a VMS is created for each dynamically allocated data type. Such a VMS contains memory space for storing all instances of the corresponding data type. In case of statically allocated data, a VMS is created for each statically allocated data structure.

For network components Virtual Memory Segments (VMS) or parts of VMSes as basic groups can be used. Indeed, they obey the first three properties of the basic group partitioning: The virtual memory segments form a partitioning of all data that has to be stored in background memory. The virtual memory segments are determined at compile time, and are therefore manifest. Every read/write instruction is associated with a single virtual memory segment. However, they do not necessarily obey the fourth property. Often the virtual memory segments can be partitioned further into basic groups while still satisfying the third basic group property.

In a further embodiment a basic group partitioning methodology for dynamically allocated and/or data-dependent indexed data structures is presented.

All compound data structures consist of a hierarchical composition of arrays and/or records: An array is a compound data structure consisting of an ordered set of objects. The objects all have the same type and are accessed via an index. A record is a compound data structure consisting of a number of named objects called fields. The fields do not have to be of the same type and are accessed by specifying their name. The elements of an array and the fields of a record can themselves be arrays and records.

In the overall design flow used in the invention, all data that has to be stored in memory is contained in VMSes. These VMSes are compound data types as described above. For instance, the virtual memory management step assigns all list nodes (records) of a certain linked list type to a common VMS. The resulting VMS is an array of list nodes (records), of which the amount of slots is determined by means of analysis or simulation.

Symbolic addresses of such data types comprise of fixed parts and variable parts. Parts of a symbolic address are fixed at compile time while others are variable due to data dependent indexing, or iterator dependent indexing.

Assuming that all data elements with a symbolic address only differing in the variable parts, are mapped on the same basic group, which is a valid assumption for network component applications, where the indices are usually data dependent and span the whole index space, the basic group being accessed from the, symbolic address can be derived in the following way: take the data type of the compound data structure (corresponding to the VMS) and concatenate all fixed parameters in the symbolic address skipping the variable ones. The last field name has to be replaced by the word number to which this field belongs, because basic group partitioning stops at the word level. If the assumption is not valid, a more elaborate analysis can partition the index space into a number of disjoint index sets. This will be explained further for RMSP applications where this splitting is much more common.

In a further embodiment a custom basic group partitioning methodology for applications containing nested loops and/or exploiting manifest (data dependent) conditions is presented. An important class of these type of applications are the real-time multi-dimensional signal processing applications. Note that: said applications have typically a hierarchical CDFG.

The data flow analysis task defines the basic groups and derives maximally parallel CDFG at the basic group level. For RMSP applications the arrays as basic groups could be used. Indeed, they obey the first three properties o the basic group partitioning. The arrays form a partitioning of all data that has to be stored in background memory. The arrays are known at compile time, and are therefore manifest. Every read/write instruction is associated with a single array. However, they do not necessarily obey the fourth property. In the presence of manifest conditional assignments or multiple uses of the same data, the arrays can usually be partitioned further into basic groups while still satisfying the third basic group property. An example of this is given in the next subsection.

Recalling the definition given earlier one can explain how the arrays can be further, subdivided into basic groups. The principle of partitioning an array A into basic groups is rather simple:

Take all operand and definition domains of instructions accessing A. Find out which of these domains are overlapping. Construct an undirected graph, where the nodes correspond to the operand and definition domains, and there is an edge between two nodes when the corresponding domains are overlapping. Find all connected subgraphs. Take for each connected subgraph the union of all domains corresponding to its nodes: these unions are the basic groups of A.

In practice, however, exact basic group partitioning in the presence of non-linear index expressions or iteration domains defined by non-linear or non-convex constraint sets is rather complex. In this case, conservative linear approximations of the domains can be used instead of the exact domain descriptions. To be conservative, every point of the real domain must also be part of the approximate domain.

The method described above may be implemented on a suitable computer such as a workstation. The workstation may be adapted by the provision of suitable software to carry out nay of the method steps mentioned above. The present invention includes an automated design system for determining an optimized memory organization of an essentially digital device, said digital device being represented by a representation describing the functionality of said digital device, said representation comprising data access instructions on basic groups, being groups of scalar signals; the design system comprising: first computing device for determining optimized scheduling intervals of said data access instructions such that execution of said functionality with said digital device being guaranteed to be within a predetermined cycle budget and said determining of said optimized scheduling intervals comprising optimizing access conflicts with respect to an evaluation criterion related to the memory cost of said digital device; and a second computing device for selecting an optimized memory organization based thereon. The optimization of access conflicts may include optimizing an extended conflict graph with respect to the evaluation criterion. The memory selection should satisfy at least the constraints depicted by said optimized extended conflict graph. The extended conflict graph may be displayed, e.g. on a VDU or printed out on a printer or plotter. The selected memory organization may be displayed on a display device such as a VDU or printed out on a printer or plotter. The first and second computing devices may be implemented as a single computer such as a workstation running the appropriate software.

It will be apparent to the skilled person that alterations and amendments can be made to the present invention in an obvious manner, the spirit and the scope of the present invention only being limited by the attached claims.

What is claimed is:

1. A method of determining an optimized memory organization of an essentially digital device represented by a representation describing the functionality of said digital device, said representation comprising data access instructions on basic groups, being groups of scalar signals, the method comprising:

determining optimized scheduling intervals of said data access instructions such that execution of said functionality with said digital device is guaranteed to be within a predetermined cycle budget, said determining of said optimized scheduling intervals comprising optimizing access conflicts with respect to an evaluation criterion related to the memory cost of said digital device, wherein optimizing the access conflicts comprises optimizing an extended conflict graph with respect to the evaluation criterion, and wherein said evaluation criterion comprises at least an estimate of the chromatic number of a conflict graph that includes an extended conflict graph not having self-edges and hyper-edges;

determining the total amount of data accesses of each self-edge of sail extended conflict graph;

determining pair-wise basic group conflict costs of binary edges of said extended conflict graph; and selecting an optimized memory organization in accordance with said optimized scheduling intervals and said optimized access conflicts, wherein the optimized memory organization is selected while satisfying at least the constraints depicted by said optimized extended conflict graph.

2. The method of claim 1, wherein said evaluation identifies which basic groups are being accessed in parallel.

3. The method of claim 1, wherein in said evaluation each conflict cost between basic groups is weighted separately.

4. The method of claim 1, wherein in said evaluation each self conflict cost of a basic group is weighted separately.

5. The method of claim 1, wherein said representation, describing the functionality of said essentially digital system, is a control data flow graph.

6. The method of claim 1, wherein the pair-wise basic group conflict cost of a binary edge of an extended conflict graph comprises:

a first term comprising a first sub-term combining the size of a first basic group of said binary edges with the total amount of data accesses of a second basic group of said binary edges and a second sub-term combining the total amount of data accesses of said first basic group of said binary edges with the size of said second basic group of said binary edges;

a second term combining the difference in bit width between said basic groups of said binary edges with the word size of the basic group of said binary edges with the smallest word size;

a third term being a function of the word size of the basic group of said binary edges with the smallest word size when said basic groups of said binary edges have non-overlapping life times and zero otherwise;

a fourth term being a predetermined positive value when the basic groups of said binary edges are preferably stored in the same memory; and a fifth term making the pair-wise basic group conflict cost of all binary edges positive.

7. The method of claim 1, wherein each of said edges is associated with a triplet of numbers, the first number of said triplet defining the amount of simultaneous data accesses to said basic groups of said edges due to read instructions, the second number of said triplet defining the amount of simultaneous data accesses to said basic groups of said edges due to write instructions and the third number of said triplet defining the amount of simultaneous data accesses to said basic groups of said edges due to either read or write instructions, said triplet being characteristic for an at least partial scheduling of said data access instructions of said functional representation, wherein the partial scheduling comprises scheduling intervals.

8. The method of claim 1, wherein selecting an optimized memory organization satisfying at least the constraints depicted by said optimized extended conflict graph comprises assigning basic groups being in conflict either to different memories or assigning basic groups being in conflict to a multi-port memory having at least a number, defined by said third number, of ports; wherein at least a number, defined by said first number, of said ports, have read capability, and wherein at least a number, defined by said second number, of ports, have write capability.

9. The method of claim 1, wherein determining optimized scheduling intervals of said data access instructions such that execution of said functionality with said digital device being guaranteed to be within a predetermined cycle budget and said determining of said optimized scheduling intervals comprising optimizing an extended conflict graph with respect to an evaluation criterion being related to the memory cost of said digital device comprises:

determining initial scheduling intervals for each of said data access instructions for each of said basic groups;

determining initial basic group conflict probabilities;

determining an estimate of the chromatic number of a conflict graph, being an extended conflict graph not having self-edges and hyper-edges, with basic group conflicts with a probability above a predetermined threshold value;

determining an initial value for said evaluation criterion by at least incorporating said chromatic number estimate and combining said initial basic group probabilities with said pair-wise basic group conflict cost;

determining an initial set of possible scheduling interval one cycle reductions, each of said reductions being related to a data access instruction having a scheduling interval of at least two cycles and having a scheduling interval overlapping with at least one other scheduling interval of a data access instruction;

(1) determining for each reduction of said set said evaluation criterion, taking into account changes in the basic group conflict probabilities and recalculating said chromatic number when due to said reduction at least one basic group conflict probability traverses said predetermined threshold value;

(2) selecting from said set a reduction with the best effect on said evaluation criterion;

(3) executing said selected reduction on at least said related data access scheduling interval; and (4) modifying said set.

10. The method of claim 9, additionally comprising repeating (1) to (4) until no further reduction of said evaluation criterion is found.

11. The method of claim 9, wherein said determining of initial scheduling intervals for each of said data access instructions for each of said basic groups is performed with an ASAP-ALAP analysis for each of said data access instructions for each of said basic groups.

12. The method of claim 1, additionally comprising:
decomposing said representation in a plurality of disjunct blocks;
determining a block cycle budget for each of said disjunct blocks; and
wherein said determining of optimized scheduling intervals being such that execution of each of said blocks is guaranteed to be within its block cycle budget.

13. The method of claim 12, wherein determining a block cycle budget for each of said disjunct blocks comprises determining an allowed-conflicts graph with respect to an evaluation criterion for said allowed conflict graph being related to the memory cost of said digital device.

14. The method of claim 13, wherein determining of an allowed-conflicts graph comprises:
determining an empty allowed-conflict graph;
determining a set of conflicts;
(1) determining for each conflict in said set a conflict cost and the gain on the cycle budget of the application;
(2) adding the conflict with the highest gain-to-cost ratio to said allowed conflict graph;
(3) modifying said set of conflicts; and
repeating (1) to (3) until the cycle budget is below a predetermined value.

15. The method of claim 13, wherein said allowed conflict graph is an undirected hyper-graph, comprising of nodes representing said basic groups; binary edges representing data access conflicts between the two basic groups connected by said binary edge; and said evaluation criterion for said allowed conflict graph comprises at least an estimate of the chromatic number of said allowed conflict graph and pair-wise basic group conflict costs of binary edges of said allowed conflict graph conflict graph.

16. The method of claim 1, wherein said functionality is a multi-dimensional signal processing application and said basic groups,are parts of multi-dimensional arrays.

17. The method of claim 1, wherein said functionality is an application with dynamically allocated memory and said basic groups being parts of virtual memory segments.

18. An automated design system for determining an optimized memory organization of an essentially digital device represented by a representation describing the functionality of said digital device, said representation comprising data access instructions on basic groups, being groups of scalar signals, the design system comprising:
a first computing device for determining optimized scheduling intervals of said data access instructions such that execution of said functionality with said digital device is guaranteed to be within a predetermined cycle budget and said determining of said optimized scheduling intervals comprises optimizing access conflicts with respect to an evaluation criterion related to the memory cost of said digital device, wherein optimizing the access conflicts comprises optimizing an extended conflict graph with respect to the evaluation criterion, wherein said evaluation comprises at least an estimate of the chromatic number of a conflict graph that includes an extended conflict graph not having self-edges and hyper-edges, wherein the first computing device determines the total amount of data accesses of each self-edge of an extended conflict graph, and wherein the first computing devices determines pair-wise basic group conflict costs of binary edges of the extended conflict graph; and
a second computing device for selecting an optimized memory organization, wherein the optimized memory organization is selected while satisfying at least the constraints depicted by said optimized extended conflict graph.

19. A method of determining an optimized memory organization of an essentially digital device represented by a representation describing the functionality of the digital device, the representation comprising data access instructions on basic groups, begin groups of scalar signals, the method comprising:
determining optimized scheduling intervals of the data access instructions such that execution of the functionality with the digital device is guaranteed to be within a predetermined cycle budget, the determining of the optimized scheduling intervals comprising optimizing access conflicts with respect to an evaluation criterion related to the memory cost of the digital device, wherein optimizing the access conflicts comprises optimizing an extended conflict graph with respect to the evaluation criterion, wherein determining comprises:
determining initial scheduling intervals for each of the data access instructions for each of the basic groups;
determining initial basic group conflict probabilities;
determining an estimate of the chromatic number of a conflict graph, being an extended conflict graph without self-edges and hyper-edges, with basic group conflicts with a probability above a predetermined threshold value;
determining an initial value for the evaluation criterion by at least incorporating the chromatic number estimate and combining the initial basic group probabilities with the pair-wise basic group conflict cost;
determining an initial set of possible scheduling interval one cycle reductions, each of the reductions being related to a data access instruction having a scheduling interval of at least two cycles and having a scheduling interval overlapping with at least one other scheduling interval of a data access instruction;
(1) determining for each reduction of the set the evaluation criterion, taking into account changes in the basic group conflict probabilities and recalculating the chromatic number when due to the reduction at least one basic group conflict probability traverses the predetermined threshold value;
(2) selecting from the set a reduction with the best effect on the evaluation criterion;
(3) executing the selected reduction on at least the related data access scheduling interval; and
(4) modifying the set; and
selecting an optimized memory organization in accordance with the optimized scheduling intervals and the optimized access conflicts, and wherein the optimized memory organization is selected while satisfying at least the constraints depicted by the optimized extended conflict graph.

20. The method of claim 19, further comprising repeating (1) to (4) until no further reduction of the evaluation criterion is found.

21. The method of claim 19, wherein determining of initial scheduling intervals for each of the data access instructions for each of the basic groups is performed with an ASAP-ALAP analysis for each of the data access instructions for each of the basic groups.

22. The method of claim 19, further comprising:
decomposing the representation in a plurality of disjunct blocks;
determining a block cycle budget for each of the disjunct blocks; and wherein determining optimized scheduling intervals is such that execution of each of the blocks is guaranteed to be within a block cycle budget.

23. The method of claim 22, wherein determining a block cycle budget for each of the disjunct blocks comprises determining an allowed-conflicts graph with respect to an evaluation criterion for the allowed conflict graph that is related to the memory cost of the digital device.

24. The method of claim 23, wherein determining of an allowed-conflicts graph comprises:
   determining an empty allowed-conflict graph;
   determining a set of conflicts;
      (1) determining for each conflict in the set a conflict cost and the gain on the cycle budget of the application;
      (2) adding the conflict with the highest gain-to-cost ratio to the allowed-conflict graph;
      (3) modifying the set of conflicts; and
         repeating (1) to (3) until the cycle budget is below a predetermined value.

25. The method of claim 19, wherein the allowed conflict graph is an undirected hyper-graph, comprising of nodes representing the basic groups; binary edges representing data access conflicts between the two basic groups connected by the binary edge; and the evaluation criterion for the allowed conflict graph comprises at least an estimate of the chromatic number of the allowed conflict graph and pair-wise basic group conflict costs of binary edges of the allowed conflict graph conflict graph.

26. The method of claim 19, wherein the functionality is a multi-dimensional signal processing application and the basic groups are parts of multi-dimensional arrays.

27. The method of claim 19, wherein the functionality is an application with dynamically allocated memory and the basic groups being parts of virtual memory segments.

28. An automated design system for determining an optimized memory organization of an essentially digital device represented by a representation describing the functionality of the digital device, the representation comprising data access instructions on basic groups, being groups of scalar signals, the design system comprising:
   a first computing device for determining optimized scheduling intervals of the data access instructions such that execution of the functionality with the digital device is guaranteed to be within a predetermined cycle budget and the determining of the optimized scheduling intervals comprises optimizing access conflicts with respect to an evaluation criterion related to the memory cost of the digital device, wherein optimizing the access conflicts comprises optimizing an extended conflict graph with respect to the evaluation criterion, wherein determining comprises:
      determining initial scheduling intervals for each of the data access instructions for each of the basic groups;
      determining initial basic group conflict probabilities;
      determining an estimate of the chromatic number of a conflict graph, being an extended conflict graph without self-edges and hyper-edges, with basic group conflicts with a probability above a predetermined threshold value;
      determining an initial value for the evaluation criterion by at least incorporating the chromatic number estimate and combining the initial basic group probabilities with the pair-wise basic group conflict cost;
      determining an initial set of possible scheduling interval one cycle reductions, each of the reductions being related to a data access instruction having a scheduling interval of at least two cycles and having a scheduling interval overlapping with at least one other scheduling interval of a data access instruction;
         (1) determining for each reduction of the set the evaluation criterion, taking into account changes in the basic group conflict probabilities and recalculating the chromatic number when due to the reduction at least one basic group conflict probability traverses the predetermined threshold value;
         (2) selecting from the set a reduction with the best effect on the evaluation criterion;
         (3) executing the selected reduction on at least the related data access scheduling interval;
         (4) modifying the set; and
   a second computing device for selecting an optimized memory organization, wherein the optimized memory organization is selected while satisfying at least the constraints depicted by the optimized extended conflict graph.

29. A method of determining an optimized memory organization of an essentially digital device represented by a representation describing the functionality of the digital device, the representation comprising data access instructions on basic groups, being groups of scalar signals, the method comprising:
   determining optimized scheduling intervals of the data access instructions such that execution of the functionality with the digital device is guaranteed to be within a predetermined cycle budget, the determining of the optimized scheduling intervals comprising optimizing access conflicts with respect to an evaluation criterion related to the memory cost of the digital device, wherein the determining of optimized scheduling intervals is such that execution of each of the blocks is guaranteed to be within its block cycle budget;
   selecting an optimized memory organization in accordance with the optimized scheduling intervals and the optimized access conflicts;
   decomposing the representation in a plurality of disjunct blocks; and
   determining a block cycle budget for each of the disjunct blocks.

* * * * *

UNITED STATES PATENT AND TRADEMARK OFFICE
CERTIFICATE OF CORRECTION

PATENT NO.   : 6,421,809 B1
DATED        : July 16, 2002
INVENTOR(S)  : Wuytack et al.

It is certified that error appears in the above-identified patent and that said Letters Patent is hereby corrected as shown below:

<u>Column 31,</u>
Line 2, delete the word "of" and replace therefor -- for --.
Line 7, delete the word "comprising" and replace therefor -- comprising the steps of --.

<u>Column 32,</u>
Line 9, delete the word "the" and replace therefor -- a --.

Signed and Sealed this

Thirtieth Day of March, 2004

JON W. DUDAS
*Acting Director of the United States Patent and Trademark Office*